(12) United States Patent
Adachi et al.

(10) Patent No.: US 11,641,670 B2
(45) Date of Patent: May 2, 2023

(54) WIRELESS COMMUNICATION DEVICE

(71) Applicant: TOSHIBA ELECTRONIC DEVICES & STORAGE CORPORATION, Tokyo (JP)

(72) Inventors: Tomoko Adachi, Kanagawa (JP); Masahiro Sekiya, Tokyo (JP); Takeshi Tomizawa, Kanagawa (JP); Daisuke Taki, Kanagawa (JP); Masaaki Ikuta, Kanagawa (JP); Tomoya Suzuki, Tokyo (JP)

(73) Assignee: TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/562,405

(22) Filed: Dec. 27, 2021

(65) Prior Publication Data
US 2022/0124808 A1 Apr. 21, 2022

Related U.S. Application Data

(63) Continuation of application No. 16/722,914, filed on Dec. 20, 2019, now Pat. No. 11,246,162, which is a (Continued)

(30) Foreign Application Priority Data

Dec. 25, 2015 (JP) ................................ 2015-254878
Sep. 13, 2016 (JP) ................................ 2016-178865

(51) Int. Cl.
*H04W 74/08* (2009.01)
*H04L 1/00* (2006.01)
(Continued)

(52) U.S. Cl.
CPC ......... *H04W 74/0816* (2013.01); *H04L 1/008* (2013.01); *H04L 1/1614* (2013.01);
(Continued)

(58) Field of Classification Search
CPC ............. H04W 74/0816; H04W 84/12; H04W 84/18; H04W 88/04; H04L 1/008; H04L 1/1614; H04L 5/0007
See application file for complete search history.

(56) References Cited

U.S. PATENT DOCUMENTS 7,924,805 B2  4/2011  Nishibayashi et al.
8,982,758 B2  3/2015  Gong et al.
(Continued)

FOREIGN PATENT DOCUMENTS

EP  3 163 783 A1  5/2017
JP  4086304 B2  5/2008
(Continued)

OTHER PUBLICATIONS

Adachi, Tomoko: "Duration/ID Field in UL-MU", IEEE 802.11-16/0065r0, Toshiba, Jan. 2016, pp. 1-10.
(Continued)

*Primary Examiner* — Harry H Kim
(74) *Attorney, Agent, or Firm* — Foley & Lardner LLP

(57) ABSTRACT

According to one embodiment, a wireless communication device includes: a receiver that configured to receives a first frame; and a transmitter that configured to transmits a second frame including a first identifier and acknowledgement information on the first frame, the first identifier being extracted from a predetermined field of the first frame and being different from a source address of the first frame.

9 Claims, 25 Drawing Sheets

Related U.S. Application Data continuation of application No. 15/266,649, filed on Sep. 15, 2016, now Pat. No. 10,524,289.

(51) Int. Cl.
| | |
|---|---|
| *H04L 1/16* | (2006.01) |
| *H04L 5/00* | (2006.01) |
| *H04W 84/12* | (2009.01) |
| *H04W 84/18* | (2009.01) |
| *H04W 88/04* | (2009.01) |
| *H04L 1/1607* | (2023.01) |

(52) U.S. Cl.
CPC .......... *H04L 5/0007* (2013.01); *H04W 84/12* (2013.01); *H04W 84/18* (2013.01); *H04W 88/04* (2013.01)

(56) References Cited

U.S. PATENT DOCUMENTS

| | | | |
|---|---|---|---|
| 9,515,925 | B2 | 12/2016 | Wentink |
| 9,736,871 | B2 | 8/2017 | Kim et al. |
| 10,034,227 | B1 | 7/2018 | Jiang |
| 10,327,204 | B2 | 6/2019 | Park et al. |
| 10,382,435 | B2 * | 8/2019 | Li ................ H04W 12/04 |
| 2003/0095571 | A1 | 5/2003 | Speight |
| 2007/0064705 | A1 | 3/2007 | Tateno |
| 2007/0258540 | A1 | 11/2007 | Ratasuk |
| 2009/0202008 | A1 | 8/2009 | Suzuki |
| 2011/0013567 | A1 | 1/2011 | Torsner et al. |
| 2011/0264915 | A1 * | 10/2011 | Cam-Winget ........ H04W 12/06 713/171 |
| 2012/0163334 | A1 | 6/2012 | Miki |
| 2012/0230317 | A1 * | 9/2012 | Kim .................... H04W 74/002 370/338 |
| 2013/0114586 | A1 | 5/2013 | Kim |
| 2013/0336182 | A1 | 12/2013 | Asterjadhi et al. |
| 2014/0307653 | A1 | 10/2014 | Liu et al. |
| 2015/0365203 | A1 | 12/2015 | Suh |
| 2016/0227579 | A1 | 8/2016 | Stacey |
| 2016/0234022 | A1 * | 8/2016 | Motika ................ H04W 12/06 |
| 2016/0278081 | A1 | 9/2016 | Chun et al. |
| 2016/0315675 | A1 | 10/2016 | Seok |
| 2017/0048048 | A1 | 2/2017 | Seok |
| 2017/0127440 | A1 | 5/2017 | Chun et al. |
| 2017/0188390 | A1 * | 6/2017 | Adachi ................ H04L 1/1614 |
| 2017/0290076 | A1 | 10/2017 | Guo |
| 2017/0310424 | A1 | 10/2017 | Chun |
| 2018/0084604 | A1 * | 3/2018 | Ou ........................ H04W 76/36 |
| 2018/0227950 | A1 | 8/2018 | Iwai |
| 2018/0288743 | A1 * | 10/2018 | Choi .................... H04L 5/0094 |
| 2018/0295567 | A1 | 10/2018 | Ko |
| 2018/0376458 | A1 | 12/2018 | Cariou |
| 2019/0132724 | A1 | 5/2019 | Asterjadhi |
| 2020/0053648 | A1 * | 2/2020 | Guo ...................... H04W 52/28 |
| 2020/0053649 | A1 * | 2/2020 | Yao ....................... H04W 76/14 |
| 2020/0053753 | A1 * | 2/2020 | Tanaka ................. H04W 48/06 |
| 2020/0245375 | A1 | 7/2020 | Ahn |

FOREIGN PATENT DOCUMENTS

| | | |
|---|---|---|
| JP | 2010-109939 A | 5/2010 |
| JP | 2014-520426 A | 8/2014 |
| JP | 2015-526943 A | 9/2015 |
| WO | WO-2012/159082 A2 | 11/2012 |
| WO | WO-2014/092487 A1 | 6/2014 |
| WO | WO-2015/068968 A1 | 5/2015 |
| WO | WO-2015/170942 A1 | 11/2015 |
| WO | WO-2015/190698 A1 | 12/2015 |
| WO | WO-2016/175328 A1 | 11/2016 |
| WO | WO-2016/175329 A1 | 11/2016 |

OTHER PUBLICATIONS

IEEE Standards Association/IEEE Computer Society: "Part 11: Wireless LAN Medium Access Control (MAC) and Physical Layer (PHY) Specifications", IEEE Std 802.11™, The Institute of Electrical and Electronics Engineers, Inc., Mar. 2012, pp. 1-2793.

IEEE Standards Association/IEEE Computer Society: "Part 11: Wireless LAN Medium Access Control (MAC) and Physical Layer (PHY) Specifications; Amendment 4: Enhancements for Very High Throughput for Operation in Bands Below 6 GHz", IEEE Std 802.11ac™, The Institute of Electrical and Electronics Engineers, Inc., Dec. 2013, pp. 1-425.

Kiseon et al.: "UL MU Procedure", IEEE 802.11-15/0365r0, LG Electronics, Mar. 2015, pp. 1-16.

Merlin et al.: "Multi-STA Acknowledgment", IEEE 802.11-15/0366r1, Qualcomm, Mar. 2015, pp. 1-16.

Porat, Ron: "SIG-A Fields and Bitwidths", IEEE 802.11-15/1354r0, Broadcom, Nov. 2015, pp. 1-17.

Stacey, Robert: "Specification Framework for TGax", IEEE 802.11-15/0132r10, Intel, Nov. 2015, pp. 1-34.

Stacey, Robert: "Specification Framework for TGax", IEEE 802.11-15/0132r13, Intel, Dec. 2015, pp. 1-38.

Zhang, Jiayin: "HE-SIGA Content", IEEE 802.11-15/1077r0, Huawei Technologies, Sep. 2015, pp. 1-21.

Merlin et al.: "Multi-ST A Acknowledgment", IEEE 802.11-15/0366r2, Qualcomm, Mar. 2015, pp. 1-16.

Stacey, Robert: "Specification Framework for TGax", IEEE 11-15-0132-13-00ax-spec-framework, Intel, Dec. 2015, pp. 1-38.

Stacey, Robert: "Specification Framework for TGax", IEEE 11-15-0132-17-00ax-spec-framework, Intel, May 2016, pp. 1-61.

Ghosh, Chittabrata et al. (Intel): "UL OFDMA-based Random Access Procedure; 11-15-1105-00-00ax-ul-ofdma-based-random-access-procedure", IEEE Draft; 11-15-1105-00-00AX-UL-OFDMA-Based-Random-Access-Procedure, IEEE-SA Mentor, Piscataway, NJ USA, vol. 802.11ax, Sep. 14, 2015 (Sep. 14, 2015), pp. 1-19, XP068098346.

Kazuyuki Sakoda, Overall Protocol of UL MU BA for Multicast Transmission, IEEE 802.11-15/1043r1 ,IEEE,URL:https://mentor.ieee.org/802.11/dcn/15/11-15-1043-01-0 0ax-overall-protocol-of-ul-mu-ba-for-multicast-transmission.pptx, Sep. 14, 2015.

Robert Stacey, Spec Framework, IEEE 802.11-15/0132r9, IEEE, URL:https://mentor.ieee.org/802.11/dcn/15/11-15-0132-09-00ax-spec-framework.doc x , Sep. 22, 2015.

\* cited by examiner

WIRELESS COMMUNICATION DEVICE

CROSS-REFERENCE TO RELATED APPLICATIONS

The present application is a continuation of U.S. patent application Ser. No. 16/722,914, filed on Dec. 20, 2019, which is a Continuation of U.S. patent application Ser. No. 15/266,649, filed on Sep. 15, 2016, which is based upon and claims the benefit of priority from Japanese Patent Application No. 2015-254878, filed on Dec. 25, 2015 and No. 2016-178865, filed on Sep. 13, 2016. The entire contents of all of the above applications are incorporated herein by reference.

FIELD

Embodiments described herein relate to a wireless communication device.

BACKGROUND

A MU (Multi-User) communication is currently proposed as one of technical items under next-generation wireless LAN (Local Area Network) standard. The technical items include UL-OFDMA (Uplink Orthogonal Frequency Division Multiple Access) communication. In UL-OFDMA, a plurality of wireless communication terminals (STA: Station) are allocated to, for example, different frequency subchannels in a frequency channel so as to simultaneously transmit frames.

A frame sequence example of an UL-MU transmission will be discussed below. First, an access point (AP) transmits a trigger frame to specify STAs for permitting the transmission of the frames through a UL. The specified STAs (in this case, STA1 to STA4) transmit the frames (in this case, data frames) to the AP according to a predetermined transmission method such as a frequency subchannel used for transmission and a PHY transmission rate.

The AP having received the frames from the STAs generates a response frame, which includes acknowledgement information on the frames, for the frames received from STA1 to STA4, and then the AP transmits the response frame to STA1 to STA4 after SIFS (Short Interframe Space:=16 μs) from the end of the frame. The response frame may be, for example, a Multi-STA BA (Multi-Station BlockAck) frame.

The Multi-STA BA frame carries the acknowledgement information on the frames received by the AP from the STAs accompanied with STAs' IDs (identifiers) which are locally allocated by the AP to the STAs in order for the STAs to distinguish the corresponding acknowledgement. For the generation of the Multi-STA BA frame, it is required at the AP to have a mechanism to convert the STAs' MAC addresses set in the frames transmitted from the STAs to the STAs' IDs. This is because in the frames received by the AP from the STAs, the MAC addresses are the only fields where the STAs are identifiable at MAC (Medium Access Control) level.

An example of such a mechanism is a method of storing an ID table by the AP, the ID table containing sets of MAC addresses and IDs corresponding to the MAC addresses. In this method, however, the number of STAs which can be connected to the AP is restricted depending on the upper limit amount of information stored in the table. In order to avoid the restriction, the AP needs to provide a memory having a sufficient capacity. Also, the larger the number of STAs connected to the AP, the longer the ID retrieval from the table. As described above, a time period from the reception of the frames from the STAs sent under MU transmission to responding with the Multi-STA BA frame is SIFS. Thus, in order to make a rapid response with a large number of STAs, a hardware resource is more consumed accordingly.

DETAILED DESCRIPTION

According to one embodiment, a wireless communication device includes: a receiver configured to receive a first frame; and a transmitter configured to transmit a second frame including a first identifier and acknowledgement information on the first frame, the first identifier being extracted from a predetermined field of the first frame and being different from a source address of the first frame.

Hereinafter, embodiments of the present invention will be described with reference to the drawings. The entire contents of IEEE Std 802.11™-2012 and IEEE Std 802.11ac™-2013, known as the wireless LAN specification and IEEE 802.11-15/0132r13 dated Dec. 7, 2015 which is Specification Framework Document directed to IEEE Std 802.11ax as a next generation wireless LAN standards are herein incorporated by reference in the present specification.

First Embodiment

A first embodiment is characterized, in a wireless LAN (Local Area Network) system including an access point (AP: Access Point), which is a wireless base station, and four wireless terminals (STA: Station), in a method of transmitting a response(s) frame from the wireless base station to the wireless terminals. Hereinafter, a wireless terminal may be simply denoted as a terminal or STA. Moreover, a wireless base station may be denoted as an access point or AP.

Figure 1:
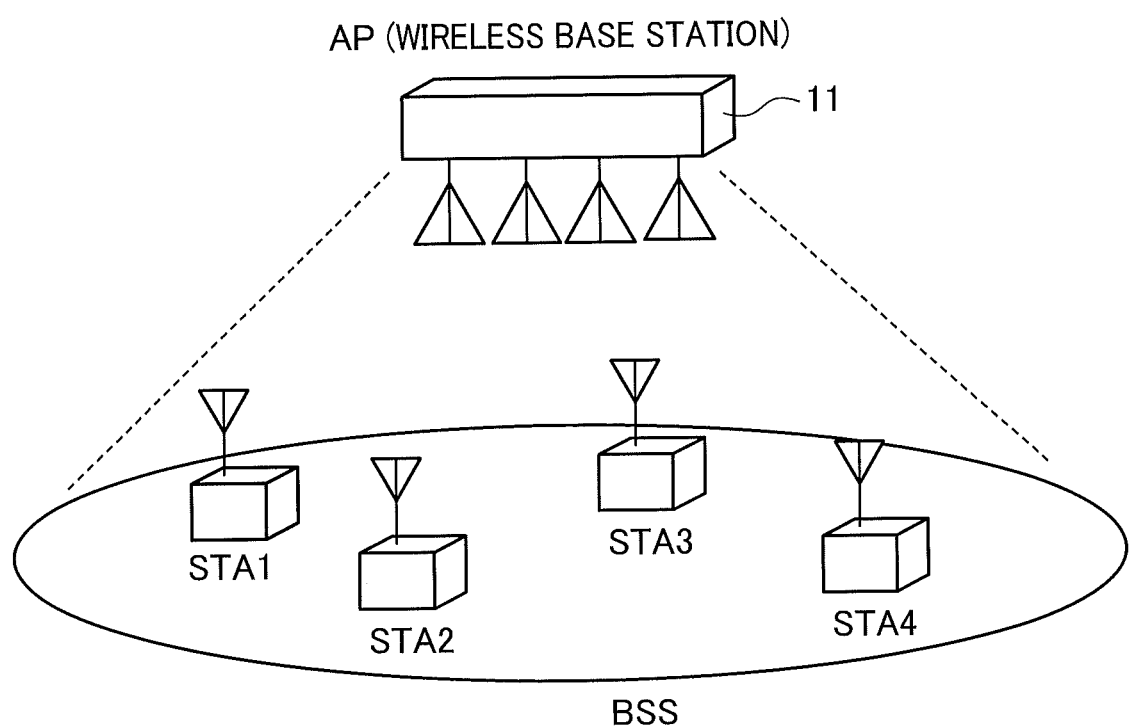
FIG. 1 is shows a wireless communication system according to a first embodiment.

FIG. 1 shows an example of the wireless LAN system according to the present embodiment. This system has a network configuration in an infrastructure mode. This configuration includes a wireless base station 11 and four wireless terminal (STAs) 1, 2, 3, and 4. Each of the STAs belongs to a BSS (Basic Service Set) formed by the AP 11. The number of wireless terminals is not limited as long as at least one wireless terminal is provided. The wireless base station in this configuration may have a simple AP function obtained by changing the operation mode setting of a mobile wireless terminal, in addition to a wireless device fixed at a certain place. In a network configuration in an ad hoc mode for direct communications performed by wireless terminals without using a wireless base station, any one of the wireless terminals may operate as an owner in the ad hoc network. In this sense, a wireless communication device according to the present embodiment is applicable to both of a wireless base station and a wireless terminal. The wireless base station has the same functions as the wireless terminal except for a relay function and thus is an aspect of the wireless terminal.

(Frame Configuration Example in the Present Embodiment)

Figure 2:
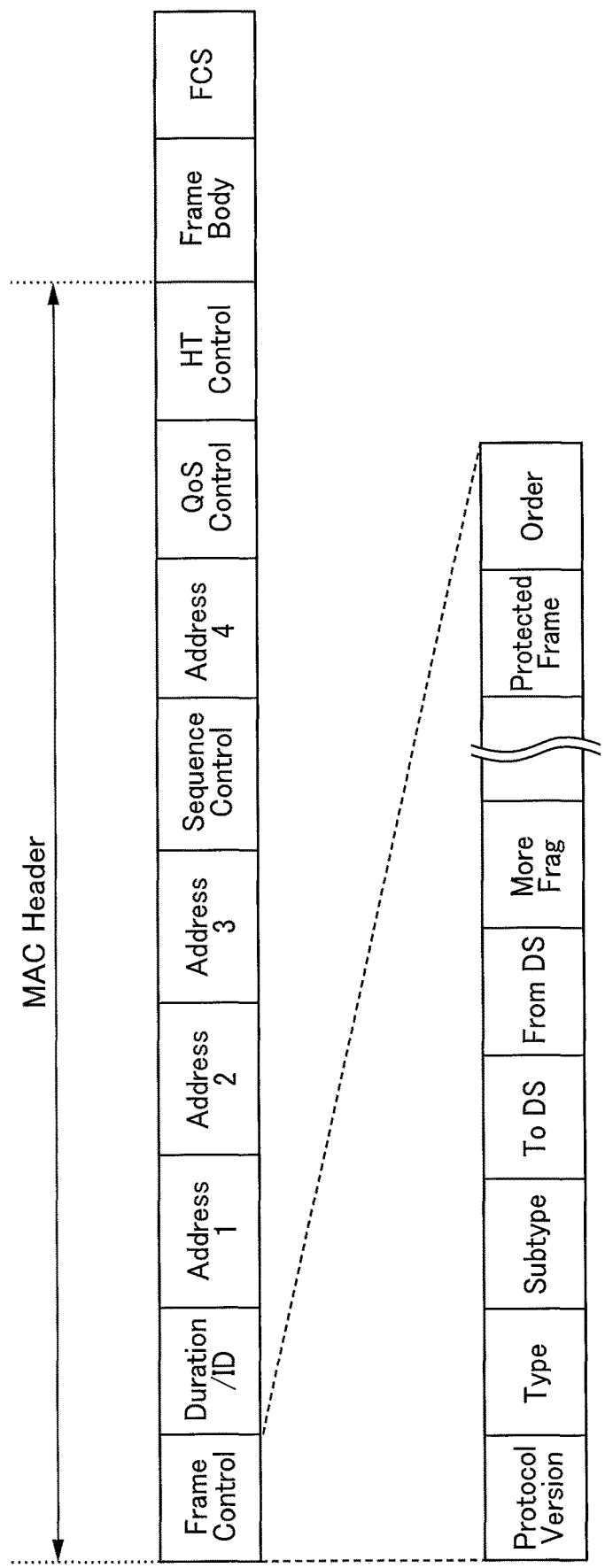
FIG. 2 shows an example of a MAC frame format.

FIG. 2 shows the configuration of a MAC (Media Access Control) frame in the wireless LAN system compliant with IEEE 802.11 standard. The examples of IEEE 802.11 standard include, for example, IEEE 802.11a, IEEE 802.11b, IEEE 802.11g, IEEE 802.11n, IEEE 802.11ac, IEEE 802.11ax, and other IEEE 802.11 standards to be specified in the future.

The MAC frame includes a MAC header, a Frame Body field, and an FCS (Frame Check Sequence) field. In the MAC header, information necessary for reception in a MAC layer is set. In the Frame Body field, information (including data from an upper layer) is set depending on the frame type. In the FCS field, a CRC (Cyclic Redundancy Code) is set as an error detection code used for determining whether the MAC header and the Frame Body field have been successfully received or not.

The MAC header includes a Frame Control field where values are set depending on the kind of frame, and a Duration/ID field. In the Duration/ID field, a transmission deferred period (NAV: Network Allocation Vector) is set or an identification number (ID) allocated to the STA connected to the AP is set. The Duration/ID field has a 16-bit length. When an MSB (most significant bit) is 0, 15 lower-order bits indicate a duration (NAV). When the MSB is 1, a part of the 15 lower-order bits indicate an ID (identification number). Under the current 802.11 wireless LAN standard, the 15th lower-order bit is 1, the 12th to 14th lower-order bits are 0, and the 11 lower-order bits are used to represent values between 1 and 2007. In the present embodiment, the ID is an AID (Association Identifier) allocated to the STA by the AP. The AID is an identifier according to the present embodiment and will be specifically discussed later.

A plurality of address fields are provided. In Address 1 field, the MAC address of a station directly receiving the frame (Receiving STA Address; RA) is set. In an address 2 field, the MAC address of a station directly transmitting the frame (Transmitting STA Address; TA) is set. In an address 3 field, basically the MAC address of a device at a final destination (Destination Address; DA) of the data is set for uplink while the MAC address of a source device (Source Address; SA) of the data is set for downlink. An address 4 field is present only during transmission from the wireless base station to another wireless base station and allows the setting of the MAC address of a device serving as a data source (SA). The number of address fields that are present varies depending on a frame type specified by Type/Subtype fields described below.

In a Sequence Control field, the sequence number of data to be transmitted and the fragment number of fragmented data are set.

The Frame Control field includes Type field that indicate a frame type, Subtype field, To DS field, From DS field, a More Fragment field, Protected Frame field, and Order field.

A bit string is set in the Type field so as to identify the frame type of the MAC frame: a control frame, a management frame, or a data frame. Moreover, a bit string in the Subtype field indicates the subtype of the MAC frame belonging to a certain frame type.

In the To DS field, information on whether the receiving station is a wireless base station or a wireless terminal is set. In the From DS field, information on whether the transmitting station is a wireless base station or a wireless terminal is set.

In the More Fragment field, information on the existence or non-existence of a subsequent fragment frame in a case where data is fragmented is stored. In the Protected Frame field, information on whether the frame is protected or not is set. In the Order field, information is set on the prohibition of a change of a frame order at time of relaying the frames. As described later, the Order field may be used to indicate the presence of an optional field.

A QoS Control field is added to a QoS Data frame serving as a data frame (on the contrary, in the case of non-QoS Data, the QoS Control field is not added). FIG. 2 shows the QoS Control field. As for whether the frame is the QoS Data frame, if a data frame is identified by the Type field, the bit string set in the subtype field is confirmed to identify whether the frame is the QoS Data frame or the non-QoS Data frame.

The QoS control field includes a TID field (16 types from 0 to 15) in which an identifier is set for data traffic, and an Ack policy field in which an acknowledgement scheme is set. The confirmation of the TID field enables to identify the traffic type of the data. Moreover, the confirmation of the Ack policy field enables to determine whether the QoS Data frame is a normal Ack policy or a block Ack policy or whether the data frame has been transmitted as No Ack policy.

The HT (High Throughput) control field is present when the Order field is set to 1 for QoS data or a management frame. The HT control field can be extended to a VHT (Very High Throughput) control field and an HE (High Efficient) control field and can provide notifications corresponding to the functions of 802.11n, 802.11ac, or 802.11ax.

The configuration of the MAC header is not limited to the above fields. For example, a new field may be added to the MAC header according to new IEEE 802.11 standard in future as in the case where the QoS control field is added under IEEE 802.11e standard.

Figure 3:
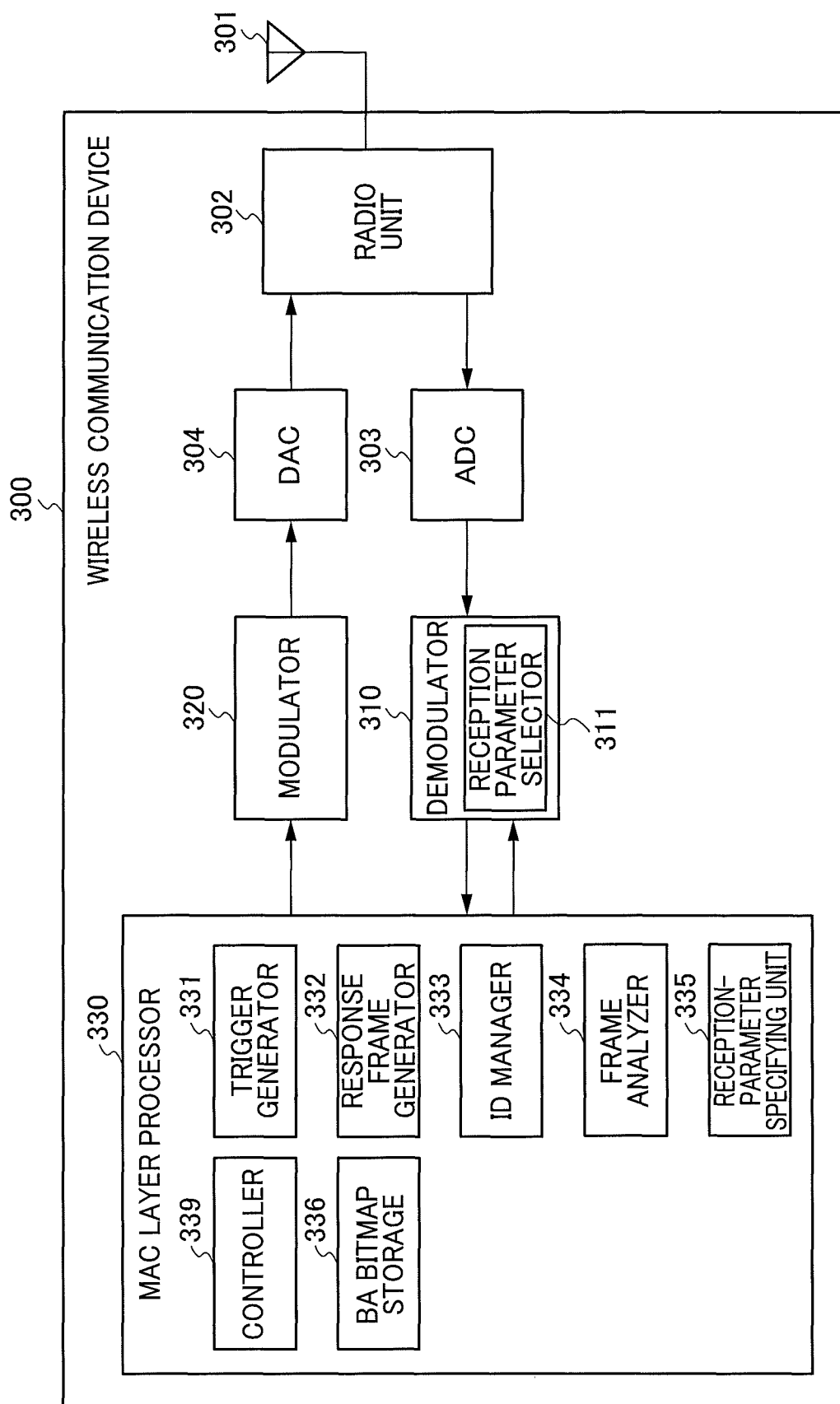
FIG. 3 is a block diagram showing a wireless communication device according to the first embodiment.

FIG. 3 shows a configuration example of the wireless communication device according to the first embodiment of the present invention. A wireless communication device 300 is compliant with, for example, IEEE 802.11. The wireless communication device includes an antenna 301, a radio unit 302, an ADC 303, a demodulator 310, a MAC layer processor 330, a modulator 320, and a DAC 304. All or part of the ADC 303, the demodulator 310, the MAC layer processor 330, the modulator 320, and the DAC 304 correspond to control circuitry that controls communications with terminals or a baseband integrated circuit. The radio unit corresponds to an RF integrated circuit or a wireless communicator that transmits or receives frames through an antenna as one example.

Processing in a digital domain of the relevant block may be partially or entirely performed using software (program) operated by a processor, e.g., a CPU, using hardware, or using both of hardware and software. A processor may be provided to partially or entirely perform the processing of the control circuitry.

The antenna 301 receives an analog radio signal transmitted at 2.4 GHz band or 5 GHz band. The signal received by the antenna 301 is subjected to frequency conversion by the radio unit 302 into a signal (baseband signal) with a proper frequency band, is converted into a digital signal by the ADC (Analog to Digital Converter) unit 303, and then is inputted to the demodulator 310. The demodulator 310 performs reception processing including, for example, predetermined demodulation and decoding in compliance with IEEE 802.11, converts the signal into a MAC frame specified by IEEE 802.11, and then transfers the frame to the MAC layer processor 330.

Meanwhile, in transmission processing, the MAC layer processor 330 generates a MAC frame (e.g., a Data frame, or a control frame such as BA, ACK, or CTS) and transfers the frame to the modulator 320. The modulator 320 performs, for example, transmission processing including predetermined modulation and coding in compliance with IEEE 802.11. After that, the DAC (Digital to Analog Converter) 304 converts the digital signal into an analog baseband signal and then the signal is inputted to the radio unit 302. The radio unit 302 up-converts the inputted baseband signal to a predetermined frequency band (e.g., 2.4 GHz or 5 GHz) and then transmits the converted signal as a radio signal from the antenna 301.

In the demodulator 310, the digital signal inputted from the ADC 303 undergoes, for example, OFDM symbol timing synchronization, FFT (Fast Fourier Transform), deinterleaving, and error correction decoding (not shown). A PHY (Physical) header includes information on frame lengths, transmission rates, and bandwidth information. The information is also extracted by the demodulator 310. The demodulator 310 uses the information for demodulation and also notifies the MAC layer processor 330 of the information.

The demodulator 310 includes a reception parameter selector 311. The reception parameter selector 311 selects either one of demodulation using a reception parameter specified by the MAC layer processor 330 or demodulation using a parameter included in the PHY header of a reception frame when the demodulator 310 demodulates a received signal.

The MAC layer processor 330 includes a trigger generator 331, a response frame generator 332, an ID manager 333, a frame analyzer 334, a reception-parameter specifying unit 335, a BA bitmap storage 336, and a controller 339.

The trigger generator 331 is a processor that generates a trigger frame for allowing the AP to specify the STAs for UL-MU transmission. Examples of the UL-MU transmission include UL-OFDMA (Uplink Orthogonal Frequency Division Multiple Access) or UL-MU-MIMO (Uplink Multi-User Multi-Input and Multi-Output). Moreover, these schemes can be combined (UL-OFDMA & UL-MU-MIMO).

The response frame generator 332 is a processor that generates a frame including acknowledgement information on the Data frames transmitted by the STAs. The acknowledgement information indicates that the AP has successfully received the Data frame (determined that the CRC of the MAC frame is success) or whether the Data frame has been successfully received or not (in a case of the Data frame being an Aggregate frame, which will be described later).

The ID manager 333 is a processor that stores IDs (e.g., an Association ID (AID)) which are identifiers for identifying the acknowledgement information, which is generated by the response frame generator 332, for the respective STAs.

The frame analyzer 334 is a processor that extracts information included the MAC frame inputted from the demodulator 310, and checks the CRC of the MAC frame. The frame analyzer 334 can also extracts information from the MAC frame to be transmitted from the MAC layer processor 330.

The reception-parameter specifying unit 335 is a processor that specifies, for the demodulator 310, a reception parameter (e.g., a transmission rate) necessary for demodulation of the frame transmitted by the STA through UL-MU.

The BA bitmap storage 336 stores the bitmap (BA Bitmap) of CRC check results on the frame (Aggregation frame) received from the STA.

The controller 339 is a processor that controls the processors 331 to 336. The processors 331 to 336 and 339 are properly connected to one another to implement the later-described operations.

The processors in the configuration of FIG. 3 may be implemented as analog or digital circuits or by software executed ty a CPU (Central Processing Unit). The ID manager 333 and the BA bitmap storage 336 may be implemented by hardware storage devices such as a memory. Furthermore, the processors may contain buffers for temporarily storing information. The buffers may be implemented by storage devices such as a memory or by digital circuits.

(Explanation of OFDMA)

In OFDM (Orthogonal Frequency Division Multiplexing) communication, transmission data is divided and is allocated to a plurality of carrier waves called sub carriers, and then the data is transmitted in parallel in a frequency direction. Conventionally, a plurality of subcarriers in a width of 20 MHz or less are arranged to transmit data for one user. In OFDMA (Orthogonal Frequency Division Multiple Access) according to the present embodiment, a certain number of subcarriers are defined as a single resource unit (RU) and then at least one resource unit is allocated to each user. This enables to simultaneously transmit data on a plurality of users within the same bandwidth as that used in the related art.

Figure 4:
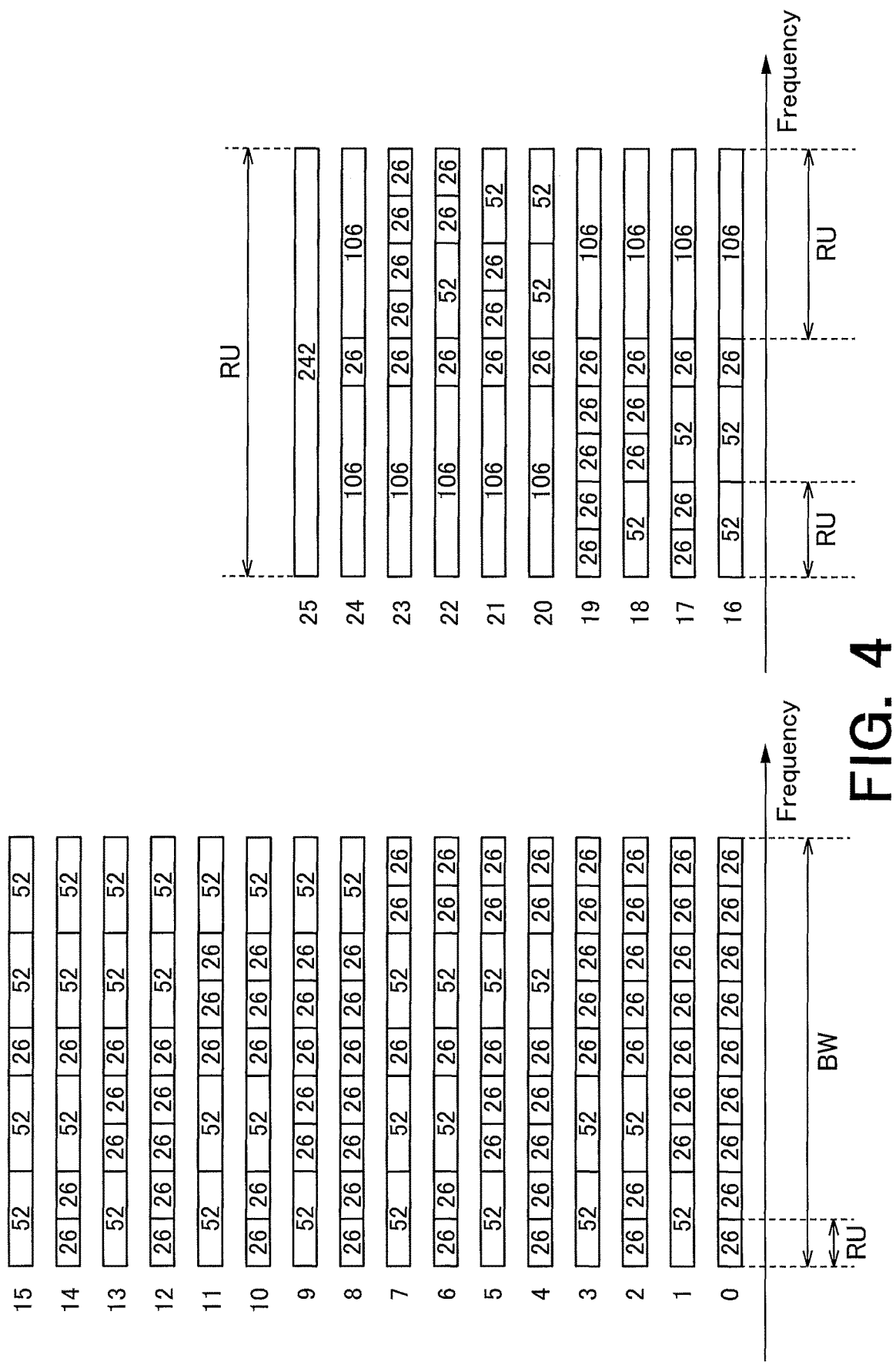
FIG. 4 is an explanatory drawing showing an example of an RU (resource unit) pattern according to the first embodiment.

As examples of the number of subcarriers included in a single RU, there are 26, 52, 106 and 242. In this case, for example, a frequency bandwidth BW (20 MHz bandwidth) has 26 RU patterns as shown in FIG. 4. The number of subcarriers included in an RU disposed at the center of the frequency bandwidth is fixed at 26. Numbers on the left side of the patterns in FIG. 4 indicate RU pattern numbers. A number in a rectangle in FIG. 4 indicates the number of subcarriers.

The demodulator 310 identifies an RU pattern number by extracting the number from the PHY header of the received frame or receiving a notification from the MAC layer processor 330. Thus, the demodulator 310 can identify an RU boundary, thereby demodulating a received signal for each RU.

(PHY Frame Format Used for UL-OFDMA Transmission)

Figure 5:
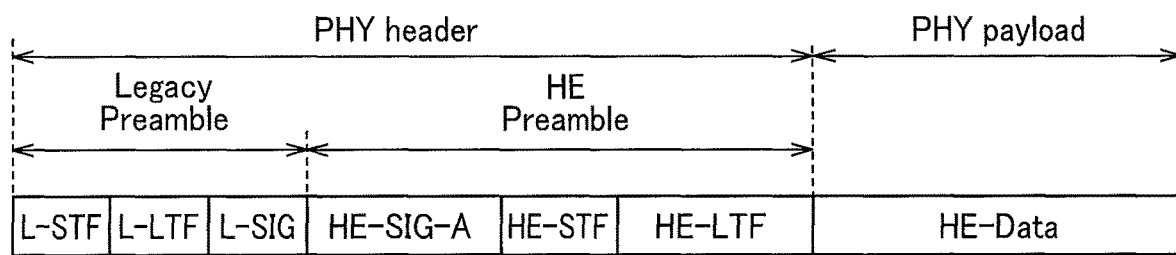
FIG. 5 shows an example of a PHY frame format according to the first embodiment.

FIG. 5 shows the format of the PHY frame used for transmission of the STA through UL-OFDMA. The PHY frame includes a PHY header and a PHY payload. The PHY header includes a Legacy Preamble part and an HE (High Efficiency (meaning a preamble specified by IEEE 802.11ax)) Preamble part. The PHY payload includes a modulated MAC frame.

The Legacy Preamble is configured like the PHY header specified by IEEE 802.11a and includes the fields of L-STF, L-LTF, and L-SIG. L-STF and L-LTF indicate known bit patterns, which are used for reception gain adjustment, timing synchronization, and channel estimation by a receiver. L-SIG includes information for allowing the receiver to calculate a time necessary for transmission with HE Preamble and PHY payload.

HE Preamble has a Preamble configuration studied under IEEE 802.11ax. HE-STF and HE-LTF in HE Preamble are used for reception gain adjustment, timing synchronization, and channel estimation.

HE-SIG-A includes information identifiable by a plurality of STAs, for example, common information to the STAs. An example of the information will be discussed below.

Format information including information on whether the PHY frame belongs to Uplink (a frame transmitted from STA to AP) or Downlink (a frame transmitted from AP to STA) and information on whether the PHY frame is a Single User frame (a frame addressed to a single STA or a frame transmitted from a single STA at a certain time) or a Multi User frame (e.g., frames addressed a plurality of STAs using OFDMA or MU-MIMO or frames simultaneously transmitted by the a plurality of STAs)

Information on the frequency bandwidth (e.g., 20 MHz, 40 MHz, or 80 MHz bandwidth) occupied by the frame Information on the length (e.g., 0.8 μs, 1.6 μs, or 3.2 μs) of Guard Interval used in the PHY payload BSS information on the wireless LAN network of the AP (for example, information on the MAC address of the AP is entirely or partially set)

TXOP (Transmission Opportunity) Duration information

In the case of BSS information including HE-SIG-A, the AP or STA having received the PHY header continues the demodulation of the frame if BSS information in HE-SIG-A is identical to BSS information stored in the own device. Meanwhile, if the BSS information stored in the own device is not identical to BSS information in HE-SIG-A, the demodulation of the frame can be stopped. Alternatively, a CCA threshold value can be increased for a signal from another BSS, and transmission is allowed below the CCA threshold value even in the occupancy time of the frame.

(The Format of the Trigger Frame)

Figure 6:
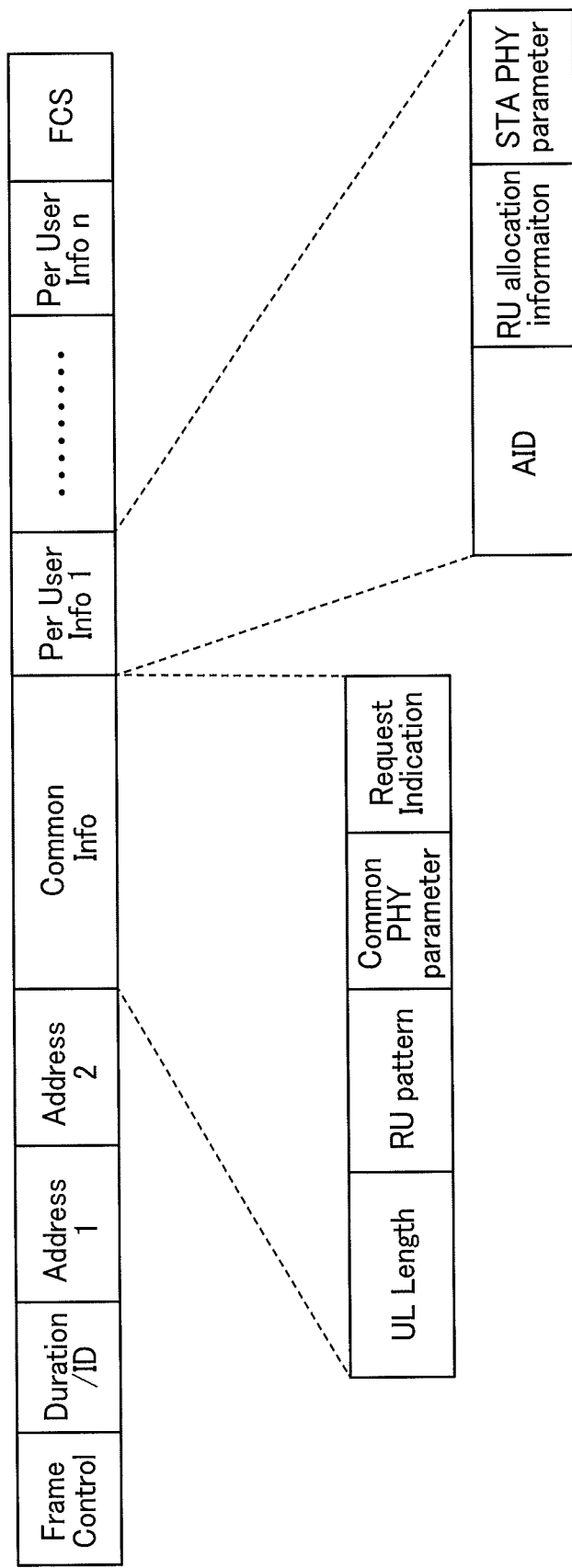
FIG. 6 shows a format example of a Trigger frame.

FIG. 6 shows a frame format example of the trigger frame. In addition to the trigger frame, the MAC Header may include the HE Control field containing information necessary for a UL-MU transmission start instruction, which will be discussed below.

The fields from Frame Control field to Address 2 field have the same roles as in FIG. 2 which illustrates the MAC frame format. Bit patterns identifiable as a trigger frame are allocated to the Type and Subtype sub fields of the Frame Control field (e.g., Type=2'b01 (which means the frame is a control frame), Subtype=4'b0011).

In Address 1 field, address information is set for specifying a plurality of STAs for which UL-MU transmission is permitted by the AP. For example, a broadcast address is set.

In Address 2 field, source information is set. For example, the MAC address of the AP is set.

In a Common Info field, information is set to be commonly notified by a plurality of STAs for frame transmission using UL-OFDMA. Examples of the Common Info field include the fields of UL Length, a RU pattern, a Common PHY parameter, and Request Indication.

UL Length includes the frame transmission time of the STAs through UL-OFDMA (for example, a time is set in a unit of microseconds or 16 μs) or information (e.g., byte counts) enabling calculation of a transmission time. This enables to align the ends of frames transmitted by the STAs.

The RU pattern includes the RU pattern number (e.g., any one of values from 0 to 25) shown in FIG. 4. This enables the STAs to identify the RU type used at UL-OFDMA transmission.

The Common PHY parameter includes parameters which need to be matched by the STAs through UL-OFDMA transmission in the PHY layer. For example, the parameter includes information indicating a frequency bandwidth (e.g., 20 MHz or 80 MHz bandwidth) or information on the length of Guard Interval of the PHY payload.

Request Indication is a field where an operation requested to the STA is indicated by transmitting the trigger frame from the AP. For example, a request is set to transmit data to the STA, a request is set to transmit a response frame of Ack or BlockAck, a request is set to report the amount of data waiting for transmission while being accumulated in the STA, and information is set to indicate that any type of frame may be transmitted (depending on the STA). Thus, the STA can determine an operation to be performed when the STA receives the trigger frame. For example, whether to transmit the Data frame or not can be determined.

A Per User Info field includes information unique to the STA that transmits a frame using UL-OFDMA. Thus, the number of the Per User Info fields is equal to or larger than the number of STAs to be triggered by the AP with the trigger frame. The Per User Info field includes, for example, the fields of an AID (Association ID), RU allocation information, and a STA PHY parameter.

The AP allocates a locally-generated number in a network when association is permitted to the STA having transmitted an Association Request frame. The number is called an AID, which is allocated from a specified range exclusive of 0. The AID is an identifier uniquely allocated in the network (BSS). The AP transmits an association response frame including the allocated AID. The STA reads the AID from the association response frame to identify the AID of the own device. The STA receives the association response frame for permitting association from the AP, and thus the STA can belong to the BSS formed by the AP and subsequently communicate with the AP. This process for association between the AP and the STA will be called an association process. The AP may perform an Authentication process before the association process with the STA.

An RU allocation information field includes information indicating the position of an RU permitted to be transmitted by the STA. The type of the RU is identified by the RU pattern of the Common Info field. Information set in the RU allocation information field indicates an RU position in the type of the RU.

The STA PHY parameter includes a parameter used in a PHY layer unique to the STA in the UL-OFDMA transmission of the STA. For example, the parameter includes PHY transmission rate information that includes an MCS (Modulation and Coding Scheme) Index indicating the transmission rate of data from the STA and the number of streams (Nsts: number of space time streams), the kind of used error correction code (e.g., LDPC (Low Density Parity Check)), and transmit power information. The AP specifies transmission power for the STAs so as to uniformly control signal power from the STAs when receiving signals from the STAs.

(Multi-STA BA Frame Format)

Figure 7:
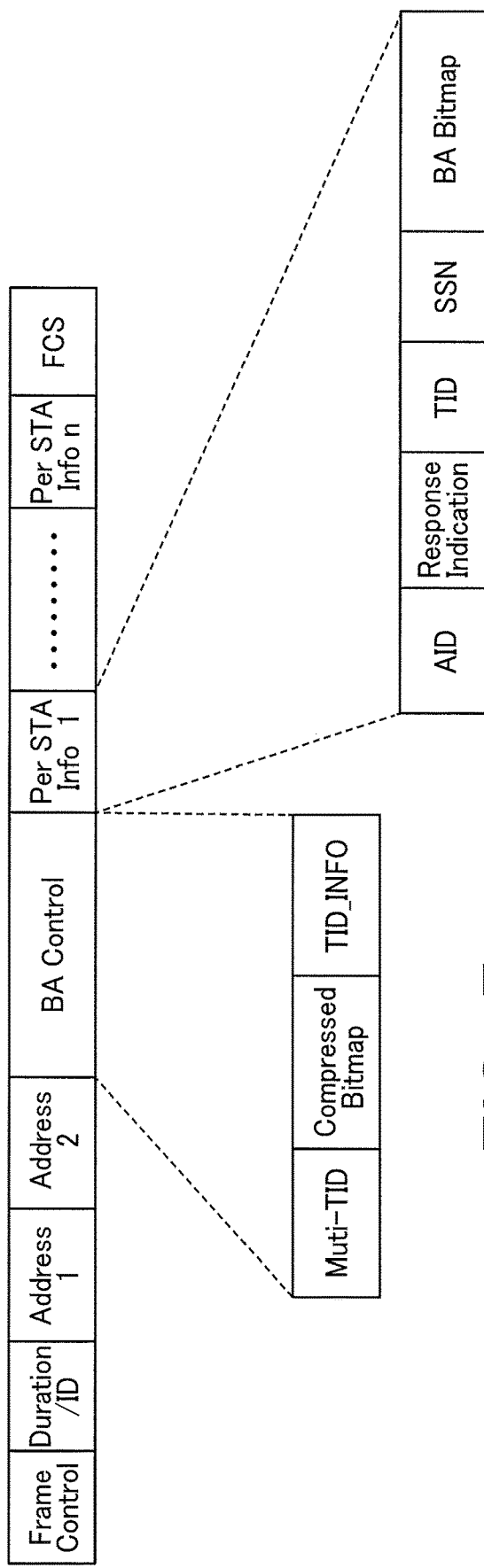
FIG. 7 shows a format example of a Multi-STA BA frame.

FIG. 7 shows a frame format example of a Multi-STA BA (BlockAck) frame.

The fields from the Frame Control field to the Address 2 field have the same roles as the MAC frame format shown in FIG. 2. Bit patterns indicating a BA frame are allocated to the Type and Subtype sub fields of the Frame Control field (e.g., Type=2'b01, Subtype=4'b1001).

In an Address 1 field, address information is set to allow each of the STAs which receives this response frame to identify that the frame is a frame addressed to itself. For example, a broadcast address is set.

The Address 2 field includes source information. For example, the MAC address of the AP (this is identical to a BSS identifier, i.e., a BSSID (Basic Service Set Identifier)) is set.

A BA Control field includes information to be commonly notified to the STAs which are destinations of the response frame (Multi-STA BA frame). The BA Control field includes the fields of Multi-TID, Bitmap without fragment information, and TID_INFO. The fields included in the BA control field need not to be limited to these fields if identification described hereafter can be achieved.

Multi-TID indicates that acknowledgement information (BA Bitmap information) is included for the Data frames of different TIDs.

Bitmap without fragment information indicates, as the length of the subsequent BA Bitmap field, whether it is changed from the conventional format that can express 16 fragments to each of the successive 64 sequence numbers. When the field has 1, the BA Bitmap field has a length of 8 octets (64 bits) and omits fragment information, whereas when the field has 0, the BA Bitmap field has a length of 128 octets with fragment information up to 16. The use and the length of the BA Bitmap field may be also derived in combination with the other field(s) in the BA control field or in the Per STA Info field.

TID_INFO indicates the common TID to subsequent acknowledgement information (BA Bitmap information). Only acknowledgement information on the Data frame of TID indicated by TID_INFO is included in BA Bitmap. When responses to multiple TIDs are expressed in the Multi-STA BA frame, the TID INFO field may be reserved or indicate information regarding the number of TIDs, such as the number of TIDs included in the Multi-STA BA frame minus 1.

In a Per STA Info field, information unique to the STA is set. When acknowledgement response is transmitted to the STAs, the number of Per STA Info fields is equal to the number of STAs. The Per STA Info field includes an AID field, a Response Indication field, a TID field, an SSN (Starting Sequence Number) field, and a BA Bitmap field.

In the AID field, the AID allocated to the STA by the AP is set when the STA established connection with the AP.

The Response Indication field indicates whether the response format to the STA is Ack or BlockAck. The Ack format means that the AP has successfully received a frame (single frame) transmitted by the STA or the AP has successfully received all the subframes (more specifically, MPDUs (Medium Access Control (MAC) Protocol Data Unit) in an Aggregate frame (which is a frame including the conjunction of subframes in the PHY frame) transmitted by the STA. The BlockAck format means that the subsequent BA Bitmap field indicates the sequence numbers (and the fragment numbers) of the subframes successfully received by the AP in the Aggregate frame (a frame including the conjunction of subframes in the PHY frame) transmitted by the STA. In the Ack format, the SSN field and BA Bitmap can be omitted.

In the TID field, the TID of acknowledgement information indicated by BA Bitmap of Per STA Info is set in a case of Multi-TID.

In the SSN (Starting Sequence Number) field, a sequence number of a frame indicated by acknowledgement information at the head of the BA Bitmap field is set.

The BA Bitmap field indicates, in a bitmap format, check results (acknowledgement information) of the subframes in the Aggregate frame transmitted by the STA wherein each check result is indicated 1 bit in the bit map. As described above, BA Bitmap may be a format having a length of 64 bits without fragment information for example. The sequence number of the first bit is expressed by an SSN. And as the bit shifts from the first bit one by one, the sequence number of the bit increases one by one. Specifically, the first bit of BA Bitmap indicates the check result of the Data frame of a sequence number indicated by an SSN, and the subsequent bit indicates the check result of the Data frame of a sequence number indicated by SSN+1. For example, if the SSN is 100, BA Bitmap indicates the check results of the Data frames of sequence numbers 100 to 163.

Figure 8:
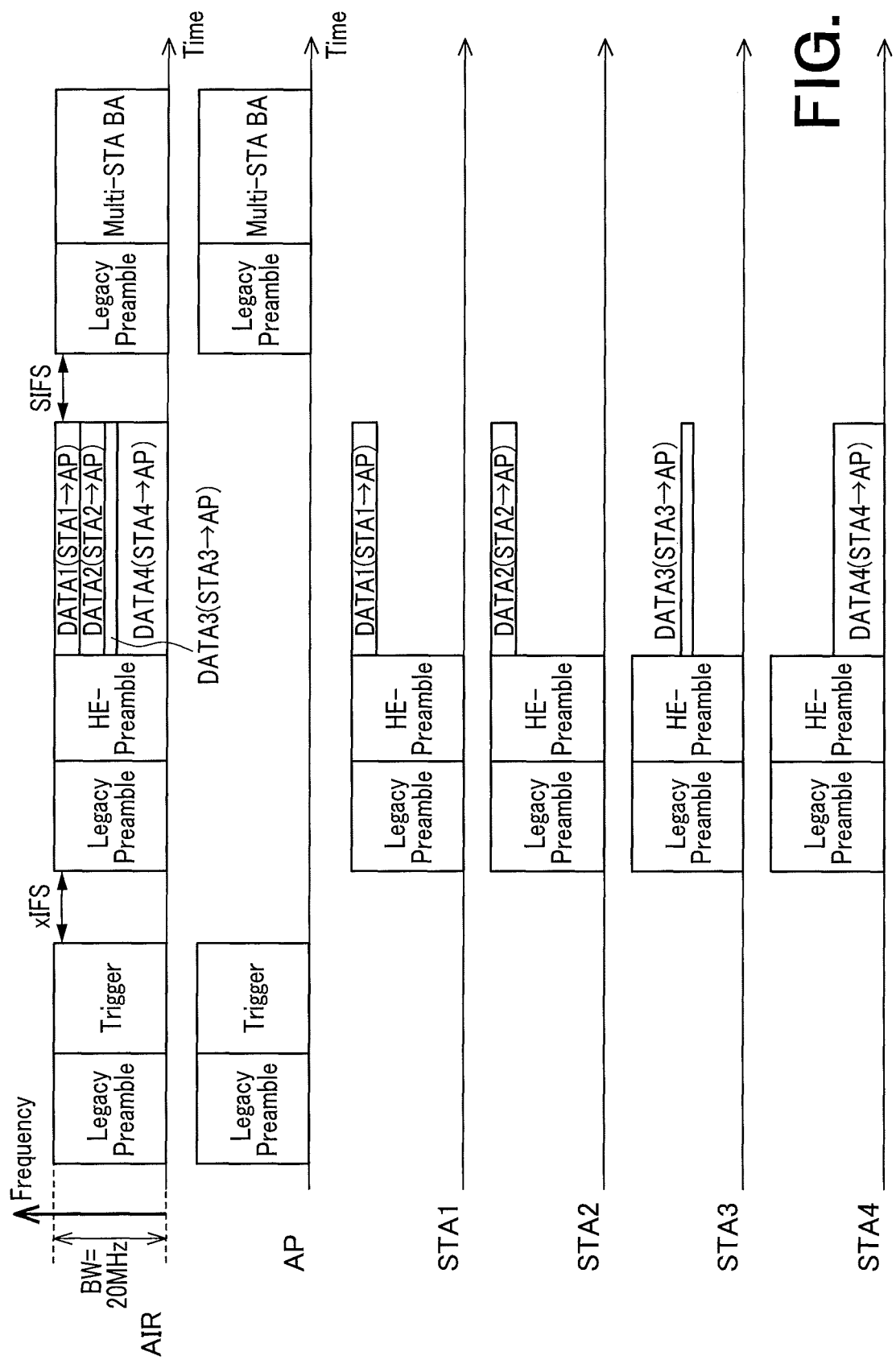
FIG. 8 shows a UL-OFDMA frame sequence example according to the first embodiment.
Figure 9:
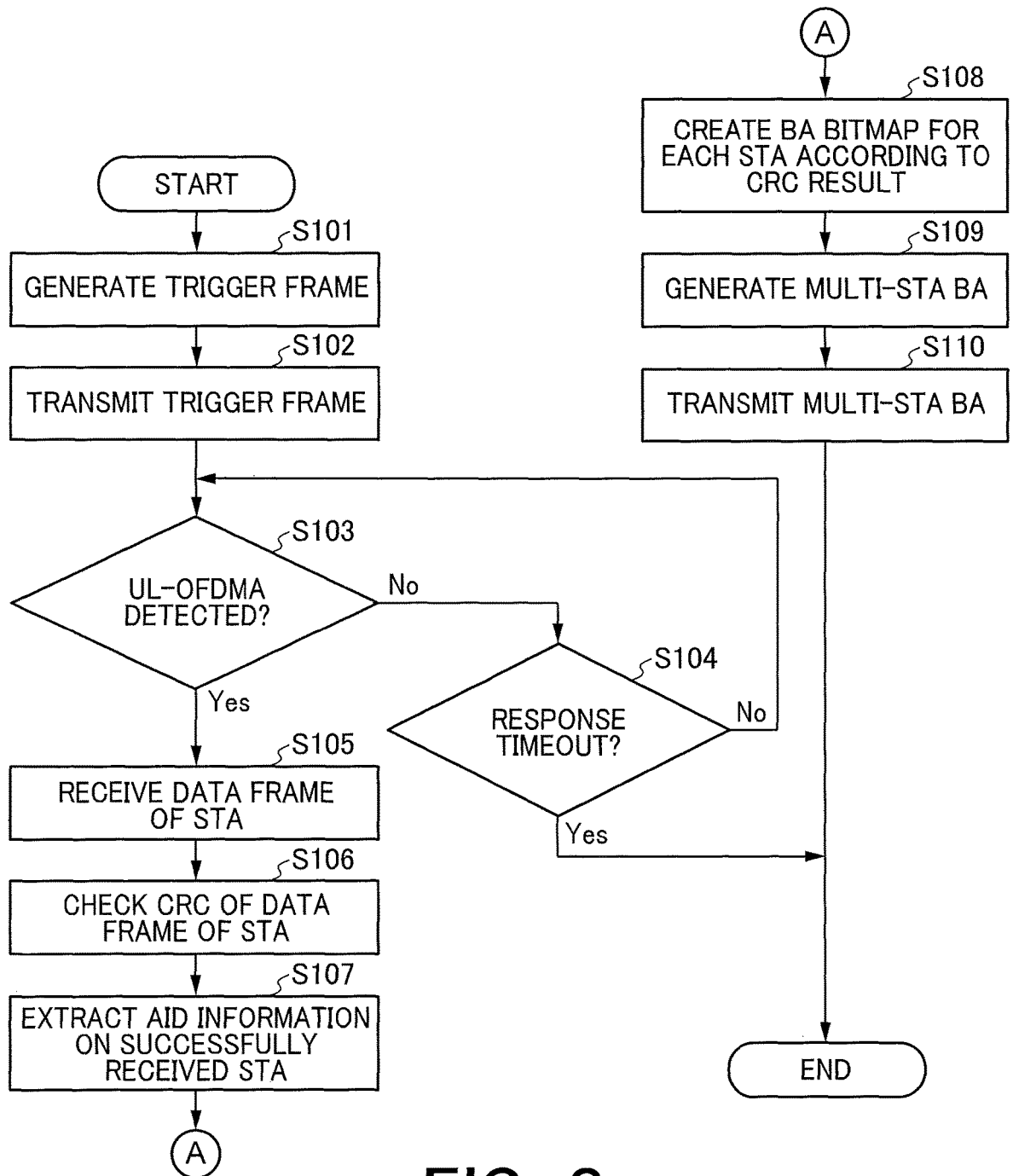
FIG. 9 is a flowchart showing an operation of an access point according to the first embodiment.

FIG. 8 shows a frame sequence example of communication between the wireless base station AP and the four wireless terminals STA1 to STA4 through UL-OFDMA. FIG. 9 is a flowchart showing an example of an operation of the AP.

(Steps Before the AP Transmits the Trigger Frame)

The controller 339 of the MAC layer processor 330 issues, to the trigger generator 331, an instruction to generate the trigger frame, and then the trigger generator 331 generates the trigger frame of the format shown in FIG. 6 (S101 in FIG. 9).

In the UL Length field of the Common Info field, the length of a UL-OFDMA packet (physical layer convergence procedure (PLCP) protocol data unit; PPDU) is set, the packet being transmitted by each STA serving as the destination of the trigger frame. More specifically, an L-SIG Length value included in the Legacy Preamble part of the PPDU is set, the value being transmitted through UL-OFDMA.

In the RU Pattern field of the Common Info field, for example, "20" is set, which means that at the RU pattern of the number 20, the STAs carries out transmission (See FIG. 4).

In the Common PHY parameter field of the Common Info field, for example, a value indicative of 20 MHz bandwidth is set as a frequency bandwidth and a value indicative of 3.2 μsec is set as a length of Guard Interval.

In the Request Indication of the Common Info field, information indicating a transmission request of the Data frame (may be specified to a subtype level) is set if the AP requests the transmission of the Data frame from the STA. If any frame type can be used in transmission from the STA, such information is set.

In this example, four STAs serve as destinations and thus four Per User Info fields are included in the trigger frame. Specifically, the trigger frame includes a Per User Info 1 field, a Per User Info 2 field, a Per User Info 3 field, and a Per User Info 4 field.

In this case, it is assumed that the AP allocated AIDs 1 to 4 to STA1 to STA4, respectively, at the time of connection setup with STA1 to STA 4.

At this point, for example, the values of Per User Info={AID, RU allocation information, STA PHY parameter} of STA1 to STA4 are determined as follows:

Per User Info 1={1, (3, 0), (MCS=7, LDPC=0, Nsts=1, TxPower=10)}
Per User Info 2={2, (2, 0), (MCS=6, LDPC=0, Nsts=1, TxPower=11)}
Per User Info 3={3, (1, 0), (MCS=6, LDPC=0, Nsts=1, TxPower=11)}
Per User Info 4={4, (0, 0), (MCS=8, LDPC=1, Nsts=1, TxPower=11)}

In this case, the RU allocation information is expressed by two-dimensional coordinates (frequency direction and spatial direction). The horizontal axis indicates a frequency direction while the vertical axis indicates a spatial direction. In the present embodiment, spatial multiplexing (MU-MIMO) is not performed and thus the spatial direction is set to 0.

It is assumed that a RU pattern numbered 20 is used, a value of 0 is set for a lowest frequency in the frequency direction and the value is increased by one each time the RU shifts to another. Thus, as shown in FIG. 4, in the RU pattern numbered 20, the RU at a lowest frequency has 106 sub carriers and the RU is numbered to 0. The subsequent RU with 26 sub carriers is numbered to 1. The subsequent two RUs with 52 sub carriers are numbered to 2 and 3, respectively.

In the present embodiment, STA1, STA2, STA3, and STA4 are allocated to RUs 3, 2, 1, and 0, respectively, and thus as described above, the RU allocation information of STAs 1 to 4 is set at (3, 0) (2, 0) (1, 0) (0, 0).

For example, in the STA PHY parameter of Per User Info 1, MCS Index is 7 and LDPC is 0. LDPC=0 means that an LDPC code is not used (Meanwhile, LDPC=1 means that an LDPC code is used). Nsts=1 means that the number of streams is one. TxPower=10 means transmission power of 10 dBm.

After the trigger frame is generated, the MAC layer processor 330 issues a transmission instruction to the modulator 320 and controls the modulator 320 to transmit the trigger frame (S102).

At this point, the reception-parameter specifying unit 335 holds (stores) a PHY parameter necessary for receiving a frame from the STAs through UL-OFDMA transmission. For example, the reception-parameter specifying unit 335 stores: an RU pattern frequency bandwidth; and, per the RU allocation information, a MCS number, the existence or non-existence of LDPC, and the stream number Nsts. This information may be set in, for example, a memory in the reception-parameter specifying unit 335 by the controller 339 before transmission of the trigger frame. Alternatively, when the MAC layer processor 330 provides a trigger frame to the modulator 320, the frame analyzer 334 may extract a desired parameter from each field of the trigger frame and set the parameter in, for example, a memory in the reception-parameter specifying unit 335.

These parameters need to be controlled to be determined at least before the demodulator 310 starts receiving the HE Preamble field of the UL-OFDMA frames from the STAs.

(Steps of Receiving the Frame from the STAs by the AP)

After transmitting the trigger frame, the AP waits for detection of a UL-OFDMA frame (S103, S104). The UL-OFDMA frame transmitted from each STA can be detected, for example, under conditions where the AP identifies the Legacy Preamble or HE Preamble. Upon lapse of response latency due to the AP being not capable of detecting the UL-OFDMA frame, a timeout may occur (Yes in S104).

In the UL-OFDMA frame, PHY transmission rate information for individual RUs of the STAs is not included in the PHY header.

Specifically, the contents of the PHY header of the UL-OFDMA frame are common among the STAs. The STAs only need to transmit common information as information on the L-SIG field and the HE-SIG-A field, thereby reducing an implementation load.

Meanwhile, since the PHY header does not include PHY parameters for individual RUs, the MAC layer processor 330 needs to notify, to the demodulator 310, a parameter necessary for receiving the UL-OFDMA frame. These parameters have been specified by the reception-parameter specifying unit 335 before or after the transmission of the trigger frame.

An operation example of the reception-parameter specifying unit 335 that specifies a parameter for receiving the UL-OFDMA frame will be discussed below.

In a first example, the reception-parameter specifying unit 335 always specifies the latest parameter for the demodulator 310. If the HE-SIG-A field of the received frame indicates the Format field of UL-MU, the demodulator 310 demodulates a received signal according to the PHY parameter specified by the reception-parameter specifying unit 335.

In a second example, the reception-parameter specifying unit 335 continuously instructs the demodulator 310 to use the parameter stored in the reception-parameter specifying unit 335 immediately after the transmission of the trigger frame.

After the transmission of the trigger frame, the first received frame is demodulated by the demodulator 310 using the parameter stored in the reception-parameter specifying unit 335. In this case, the demodulator 310 may start demodulation from HE-STF without demodulating L-SIG and HE-SIG-A, or ignore the demodulation results. In the event of a timeout in wait for a received frame, the reception-parameter specifying unit 335 may cancel the instruction.

(CRC Check of the Data Frame of the STA to BA Bitmap Generation)

The frame analyzer 334 receives, for each RU, data demodulated by the demodulator 310 and performs CRC check on the MAC frame. In the MAC frame with a success of CRC check, if 16 bits of the Duration/ID field include bits [15:14] of 2'b11, at least 11 lower-order bits ([10:0]) are extracted as an AID (S107) and are stored in a memory or the like. If 16 bits of the Duration/ID field include a bit [15] of 1'b0, the lower-order bits are not extracted as an AID (the value is not stored by the ID manager 333). Alternatively, upon reception of UL-MU, 11 lower-order bits may be extracted as AIDs on the assumption that the Duration/ID field of each Data frame includes the AID. Whether reception of UL-MU has been carried out or not may be determined depending on whether reception has been started upon lapse of a fixed time after the transmission of the trigger frame, or by confirming the Format parameter of the header of the PPDU received based on an operation in FIG. 10, which will be discussed later. The extraction of an AID from the Duration/ID field can eliminate the need for searching for an AID based on a MAC address and a table where MAC addresses and AIDs are associated with one another, unlike in the related art. This is a significant feature of the present embodiment. As will be described later, when a UL-OFDMA frame is generated, the STA sets the AID of the own terminal in the Duration/ID field of the frame.

If necessary, a source address (the MAC address of the STA) may be extracted from the Address 2 field and stored. In management of BA Bitmap information for each STA, BA Bitmap may be managed together with the MAC address of the STA, instead of an AID.

(Storing of BA Bitmap Information)

If the AP receives the MAC frames from the STAs, the BA bitmap storage 336 stores acknowledgement bitmap information (or a circuit, e.g., a flip-flop capable of at least temporarily storing information) for each STA, where the information indicating whether the MAC frames have been successfully received or not (S108).

Per STA Info of the Multi-STA BA frame includes a starting sequence number (SSN) and a BA Bitmap field in which 0 or 1 is set for each check result. In the BA Bitmap field, check results of frames (subframes) starting from the starting sequence number are set 0 or 1 from the head bit of the BA Bitmap field. For example, in the BA Bitmap format without fragment information, 1 is set at the bit position corresponding to the sequence number of the frame in a BA Bitmap field if the frame is successfully received by the AP, whereas 0 is set at the bit position corresponding to the sequence number of the frame having not been successfully received in a BA Bitmap field.

(The AP Generates and Transmits the Multi-STA BA Frame)

For example, the AP sets the values of the fields in Multi-STA BA as will be discussed below (S109).

In the present embodiment, the Multi-TID field is set at 0 on the assumption that a response is made to one TID information in a single Multi-STA BA.

The Compressed Bitmap field is set at 1 on the assumption that shortened Bitmap is used.

The TID_INFO field has the same value as the TID of the QoS Control field of a frame received from the STA.

A setting example of the Per STA Info 1 field will be discussed below.

The AID field is set to the AID of STA1. The AID (a value set for the Duration/ID field of a frame received from STA1) of STA1 is set, where the AID being stored in the ID manager 333.

In the Response Indication field, a value indicating BA (Block Ack) is set. Specifically, in order to return BA Bitmap information generated by the BA bitmap storage 336, information indicating BA is set (e.g., 0 is set). Meanwhile, if the BA Bitmap information is omitted, information indicating Ack is set (e.g., 1).

In TID, the same value is set as TID in the QoS Control field of the frame received from STA1. Specifically, the frame analyzer 334 sets a TID value extracted and stored from the QoS Control field of the Data frame from STA1. If Multi-TID is 0, a value does not always need to be set in the TID field.

In the SSN field, a value is set as a starting sequence number corresponding to a starting position (head bit) of BA Bitmap of STA1. Specifically, when bitmap information is generated and is stored in the BA bitmap storage, a sequence number corresponding to the starting position (head bit) is obtained and is set in the SSN field. The sequence number is a value extracted from the Sequence Number field of the QoS Data frame by the frame analyzer 334. For example, the oldest sequence number out of the sequence numbers held for the QoS Data frame (Aggregation frame) having been received from STA1 is set.

In the BA Bitmap field, bitmap information is set to indicate the CRC check results of subframes in the QoS Data frame received from STA1. The bitmap information is stored in the BA bitmap storage. The frame analyzer 334 generates the bitmap information based on the CRC results of the QoS Data frame. The bitmap information is stored in the BA bitmap storage 336.

In Per STA Info 2 to Per STA Info 4, information on STA2 to STA4 is set, respectively, as in the case of STA1.

The response frame generator 332 sets, for example, a broadcast address (48'hFFFF_FFFF_FFFF) in the Address 1 field of the Multi-STA BA frame. In the Address 2 field, the MAC address of the AP is set. In the subsequent fields, the above values are set. The Multi-STA BA frame is generated thus (S109).

The controller 339 controls to transmit the Multi-STA BA frame such that the Multi-STA BA frame is transmitted after a lapse of SIFS, which is a minimum frame spacing in the transmission of a response frame, from the completion of reception of the UL-OFDMA frame (S110). The response frame generator 332 transfers the Multi-STA BA frame to the modulator 320. A digital signal obtained by coding and modulating the frame through the modulator 320 is converted into an analog signal in the DAC 304, undergoes up-conversion and power amplification in the radio unit 302, and is transmitted as a radio signal from the antenna 301.

Figure 10:
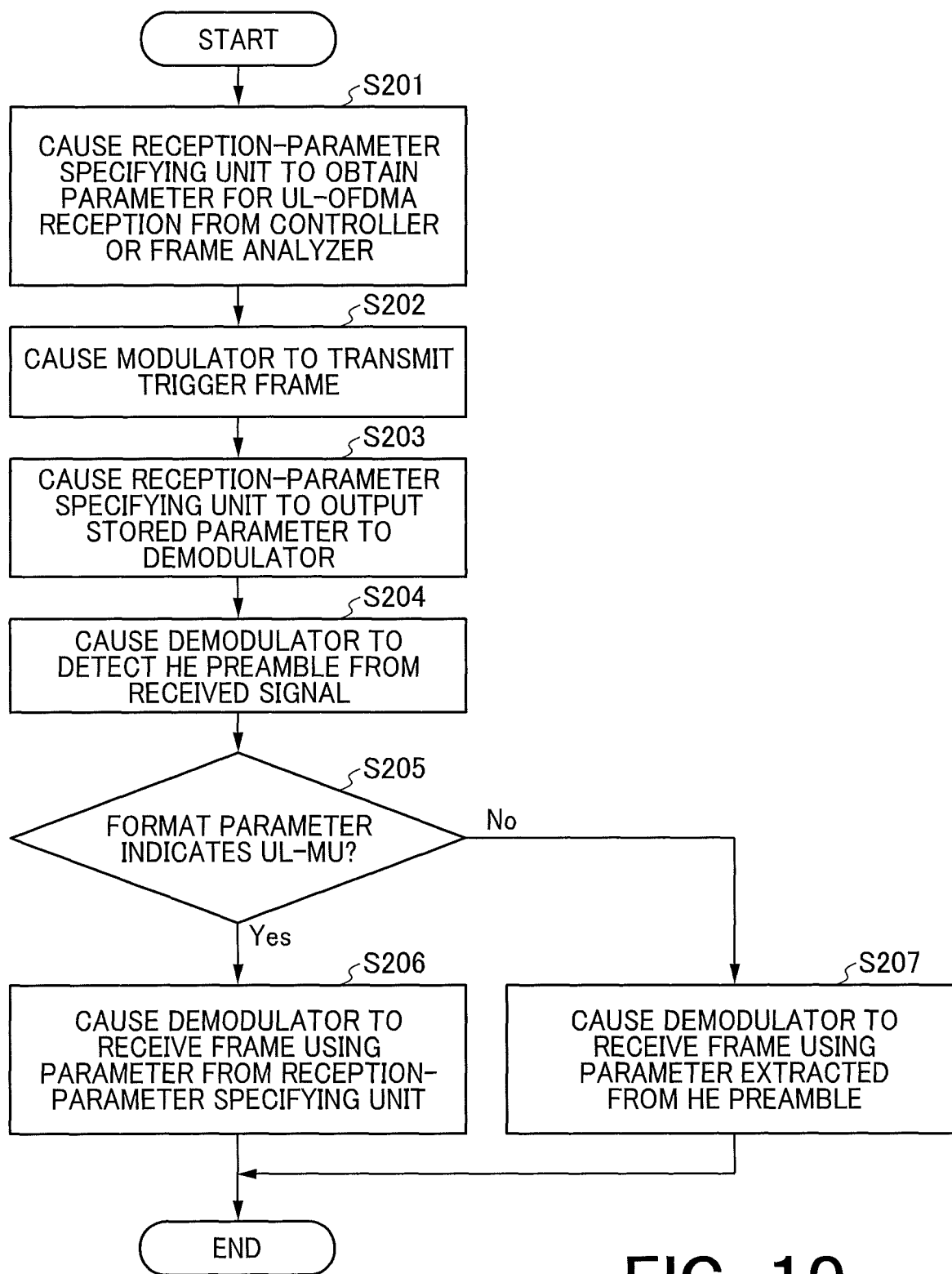
FIG. 10 is a flowchart showing a parameter setting for UL-OFDMA reception according to the first embodiment.

FIG. 10 shows a flowchart of a parameter setting example for UL-OFDMA reception in the AP. The reception-parameter specifying unit 335 obtains a parameter for UL-OFDMA reception from the controller 339 or the frame analyzer 334 (S201). The reception-parameter specifying unit 335 outputs the stored parameter to the demodulator 310 before or after the trigger frame is transmitted from the modulator 320 (S202, S203). When the demodulator 310 detects HE Preamble from a received signal, for example, after a fixed time (xIFS which will be discussed later) for transmission of the trigger frame (S204), it is determined whether the Format parameter included in the HE preamble indicates UL-MU or not (S205). If the parameter indicates UL-MU (SU is not indicated), the demodulator 310 receives (demodulates) the frame using the parameter specified by the reception-parameter specifying unit 335 (S206). Meanwhile, if the Format parameter does not indicate UL-MU (SU is indicated), the demodulator 310 receives (demodulates) the frame using the parameter extracted from HE Preamble (S207).

Figure 11:
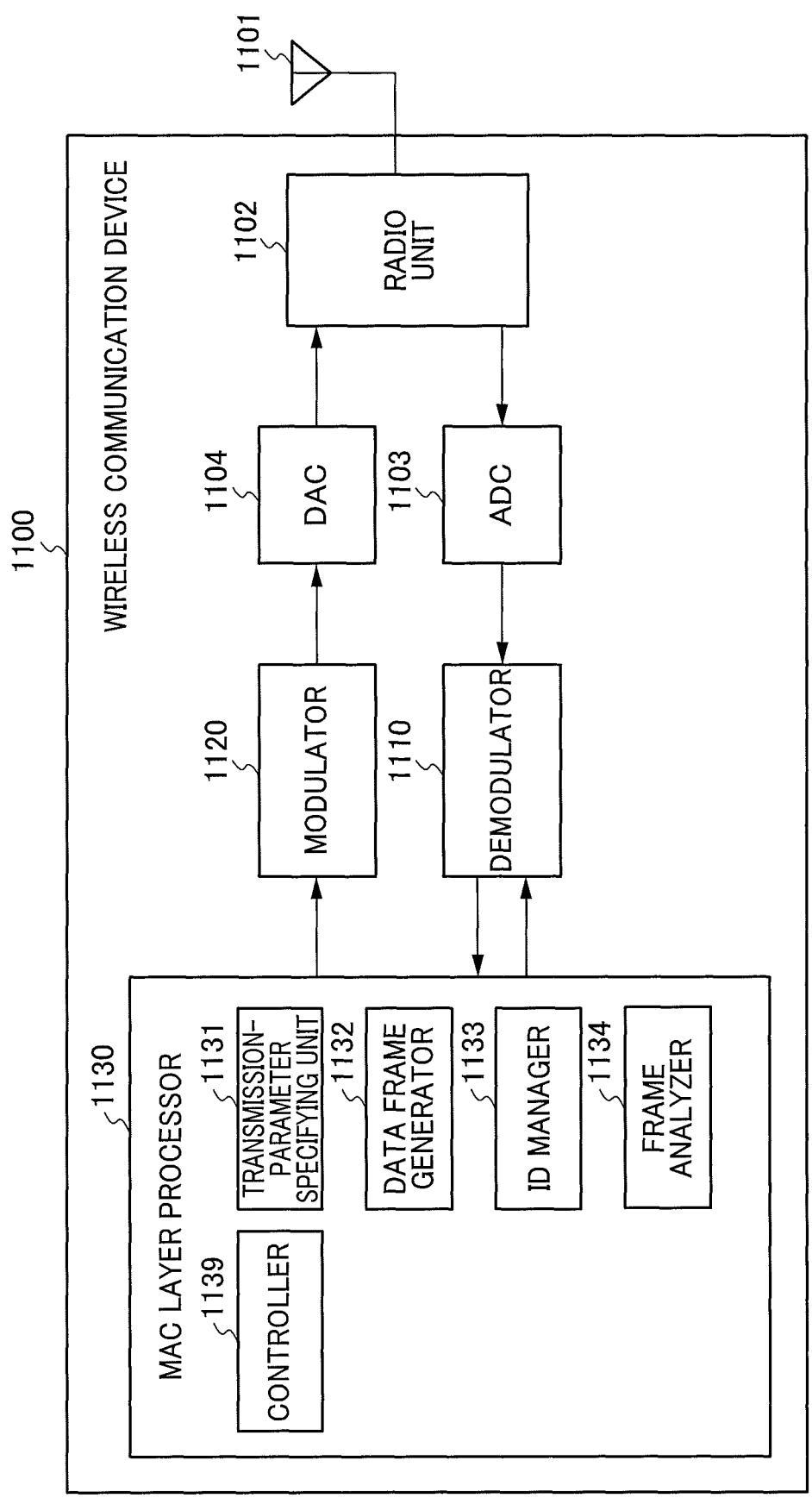
FIG. 11 is a block diagram showing the wireless communication device according to the first embodiment.

FIG. 11 shows a configuration example of a wireless communication device (e.g., STA1) 1100 on the terminal side according to the first embodiment of the present invention. The wireless communication device 1100 includes an antenna 1101, a radio unit 1102, an ADC 1103, a DAC 1104, a demodulator 1110, a modulator 1120, and a MAC layer processor 1130. The elements 1101 to 1120 are basically configured as those of the wireless communication device 300 on the access point side. All or part of the ADC 1103, the DAC 1104, the demodulator 1110, the modulator 1120, and the MAC layer processor 1130 are equivalent to control circuitry that controls communications with the AP, or a baseband integrated circuit. The radio unit corresponds to an RF integrated circuit or a wireless communicator that transmits or receives frames through an antenna as one example. Processing in a digital domain of the relevant block may be partially or entirely performed using software (program) operated by a hardware processor, e.g., a CPU, using hardware, or using both of hardware and software. A processor may be provided to partially or entirely perform the processing of the control circuitry.

The MAC layer processor 1130 includes a transmission parameter specifying unit 1131, a data frame generator 1132, an ID manager 1133, a frame analyzer 1134, and a controller 1139. The controller 1139 is a processing unit for controlling the other processing units 1131 to 1134. The processing units 1131 to 1134 and 1139 are properly connected to one another to implement the following operations:

The data frame generator 1132 receives the trigger frame from the AP. If the own device is specified, the data frame generator 1132 generates a QoS Data frame in which the AID of the own device is set for the Duration/ID field.

Figure 12:
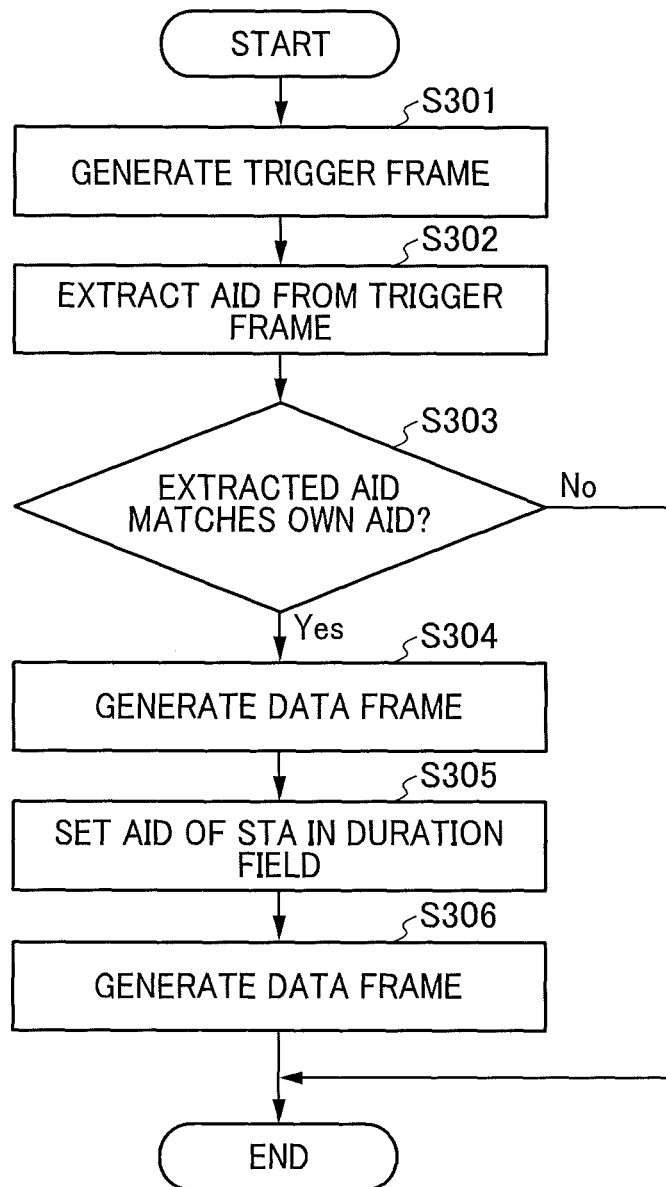
FIG. 12 is a flowchart showing an operation example of a terminal according to the first embodiment.

FIG. 12 shows a flowchart in which STA1 receives the trigger frame from the AP and transmits a data frame based on UL-OFDMA after a lapse of xIFS.

The time of xIFS is desirably shorten (e.g., SIFS of 16 μs or PIFS of 25 μs) such that the STA has a time interval for UL-OFDMA transmission and an irrelevant STA does not find an idle of a wireless medium (radio medium) by carrier sensing to transmit a different frame before the transmission of the UL-OFDMA by the STA. Alternatively, if the STA checks a condition of the wireless medium before the UL-OFDMA transmission, sIFS may have a value larger than SIFS and smaller than DIFS (=34 μs).

When STA1 receives the trigger frame (S301), the frame analyzer 1134 analyzes a field in the trigger frame. Thus, when the MAC address of the Address 2 field matches the MAC address of the AP of STA1, the value of the Common Info field is temporarily stored in the memory and then it is confirmed whether at least one Per User Info field includes a field matching the AID of STA1 (S302). When the frame analyzer 1134 detects a Per User Info field including an AID matching an AID (an AID allocated to STA1 from the AP) (AID=1 in the present embodiment) stored in the ID manager 1133 (Yes in S303), the value of the RU allocation information sub field of the Per User Info field and the value of the STA PHY parameter are stored in the memory.

Meanwhile, if at least one Per User Info field including an AID matching the AID of STA1 cannot be detected, no response is made to the trigger frame (No in S303).

If the CRC check result of the trigger frame is OK, the frame analyzer 1134 transfers a parameter (the RU pattern, the Common PHY parameter, the RU allocation information, the STA PHY parameter) temporarily stored in the memory, to the transmission parameter specifying unit 1131.

If the frame analyzer 1134 determines that the AID of STA1 matches the AID of the trigger frame and STA1 includes data to be transmitted, the data frame generator 1132 generates a data frame (e.g., the QoS Data frame) (S304). If a data frame is generated, two higher-order bits of 16 bits of the Duration/ID field in the MAC header are set at [15:14]=2'b11, for example, in order to indicate the existence of the AID in the Duration/ID field as in the related art, and the AID of STA1 is set at least as the values of 11 lower-order bits (S305). The AID stored in the ID manager 1133 is used. A transmitted frame may be a management frame or a control frame instead of the data frame. In this case, the AID is set in the Duration/ID fields of the frame and thus the data frame generator 1132 may be called a frame generator 1132. Alternatively, an Aggregate frame may be generated. If the Aggregate frame in which subframes are conjunct is generated, a common AID is desirably set in the Duration/ID fields of the subframes. The setting of the same AID information allows acquisition of AID information only by receiving any one of the subframes, achieving a robust mechanism.

Before the transmission of the data frame, the transmission parameter specifying unit 1131 notifies the following parameters to the modulator 1120. The following examples are for STA1.
  RU pattern=20
  Common PHY parameter
    Frequency bandwidth=20 MHz bandwidth
    Guard Interval length=3.2 μsec
  RU allocation information=(3,0)
  STA parameter
    MCS=7
    LDPC=0 (LDPC is not applied)
    Nsts=1
    Tx Power=10

After the data frame generator 1132 generates the QoS Data frame, the controller 1139 instructs transmission of the QoS frame, causing the data frame generator 1132 to transfer the QoS frame to the modulator 1120. Thereby, the frame shown in the frame sequence of STA 1 in FIG. 8 is transmitted (S306). The PHY header is transmitted at 20 MHz bandwidth and the MAC frame is transmitted in the band of RU.

Figure 13A:
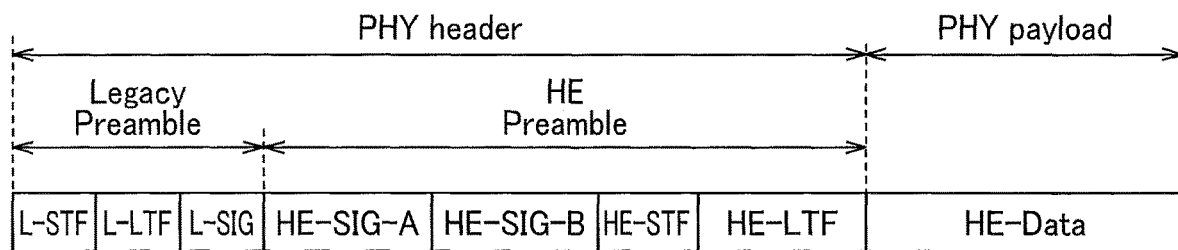
FIG. 13A shows another example of the PHY frame format according to the first embodiment.

The AP extracts the AID set in the Duration/ID field of the QoS Data frame transmitted by STA1. After that, when the AP generates the Multi-STA BA frame, the extracted AID is set in the AID sub field of Per STA Info 1 field. Thus, STA1 having received the Multi-STA BA frame from the AP can search the Per STA Info fields in the STA BA frame for the Per STA Info field matching the AID of the own device. Furthermore, the AP determines whether the QoS Data frame (or the Aggregate frame) has been successfully transmitted or not from the Per STA Info field by the own device. Also when the BA frame or the ACK frame is transmitted by DL-OFDMA or DL-MU-MIMO, an ID is set in an HE-SIG-B field (will be discussed later) to separate among the STAs. Thus, if the ID is an AID or a partial AID, the ID set in the Duration/ID field can be similarly used for generating packets. At this point, in a receiving operation of the STA, an AID or a partial AID is extracted from the HE-SIG-B field, and the BA frame or the ACK frame for the own STA is received and decoded. In a packet used at DL-MU transmission, as shown in FIG. 13A, HE-SIG-B is added between HE-SIG-A and HE-STF. Incidentally, a part (head) of the HE-SIG-B field may be transmitted with a channel width and the other part (end) of the field may be transmitted with different resources (resource units) among the STAs at destinations. In this case, the ID for separating the STAs may be set at the part of the channel width or the end transmitted with resources for the respective STAs. The entirety of HE-SIG-B field may be transmitted with a channel width or the entirety of HE-SIG-B field may be transmitted with different resources among the STAs.

In the embodiment, if TXOP Duration information is set for HE-SIG-A, a third terminal (3rd STA) with a NAV set according to the TXOP Duration information may not start an EIFS (Extended InterFrame Space) even if the subsequent packet portion (including the MAC frame) cannot be decoded. This can prevent unfair of access to a wireless medium among terminals after the completion of the frame sequence.

In the above embodiment, the STAs have capability to set the AID in Duration/ID and make UL-OFDMA transmission. The AP may obtain whether the STA has such capability or not when the AP is connected to the STA. Specifically, the STA may add an information element, which is a notification of the capability, to an association request frame during an association process, and the AP may identify the capability of the STA, accordingly. Only the STA having the capability may be specified according to the trigger frame. In the existence of the STA not having the capability, SU transmission is used (UL-MU is not used) or a setting of BA transmission is set as Delayed BA. In the latter case, upon reception of the BAR (BlockAck Request) frame from each STA through UL-SU, the ACK frame may be transmitted after a lapse of SIFS, and then the BA frame may be transmitted, for example, after the access right to the media for a DL-SU is acquired.

In DL-MU-MIMO, a technique called beam forming is used to form beams spatially orthogonal to the STAs and transmit frames. For beam formation, the channel response of downlink to the STAs is used. Thus, the AP transmits a sounding frame (e.g., a null data packet) beforehand to each STA and receives feedback of a downlink channel response measured by each STA. Thereby, the AP obtains the channel response of downlink with each STA. In order to form beams to the STAs through the channel responses, a known technique may be used. For example, a signal to be transmitted to STA is weighted for each antenna, and then the weighted transmission signal is transmitted from each antenna, and this process is carried out for each of the STAs. Thereby, the weighted signals for each of the STAs are transmitted via the antennas simultaneously. Here, the weighting of the transmission signal of each antenna for each STA such that the STA appropriately receives the transmitted signal directed to the STA-self and the other STAs does not receive the transmitted signal, i.e., receives a null signal. According to DL-MU-MIMO, it is standardized under IEEE 802.11ac and the means standardized may be used. DL-OFDMA is OFDMA carried out in the opposite direction of UL-OFDMA, i.e., in a direction from the AP to the STAs. The DL-OFDMA transmission is basically identical to the UL-OFDMA except for the communication direction but the PHY header used in the DL-OFDMA may have a different structure from that used in the UL-OFDMA.

(The Effect of the Present Embodiment)

In the related art, the AP extracts the MAC address of the STA from the Address 2 field of the QoS Data frame received from the STA and searches for an AID through a table of correspondence between MAC addresses and AIDs. Thus, if many STAs are connected to the AP, the memory that stores the table requires a large capacity. If an AID retrieval time is extended and the response frame (Multi-STA BA frame) is require to be transmitted after a lapse of SIFS from the completion of reception of the UL-OFDMA frame, there is a possibility that the generation of the response frame is too late. In the present embodiment, however, an AID extracted from the Duration/ID field of the QoS Data frame from the STA can be directly set in a predetermined field (AID field) in the Per STA Info field of the Multi-STA BA frame by the AP. This can reduce capacity of the memory that stores the table of correspondence between MAC addresses and AIDs, and considerably reduce a time period during which the AP specifies the AID of the STA, even if the number of STAs connected to the AP increases.

(Variations in UL Transmissions)

In the embodiment, if the STA transmits the frame through UL-MU for the trigger frame transmitted by the AP, the AID is set in the Duration/ID field of the frame. This method is also applicable to another frame sequence example. In other words, this method is also applicable to UL-SU (Uplink Single User) that allows the single STA to autonomously transmit a frame without receiving the trigger frame from the AP. Specifically, the AID of the STA is set in the Duration/ID field of the frame (e.g., the QoS Data frame) transmitted through UL-SU. The AP returns the Multi-STA BA frame including the single Per STA Info field to the QoS Data frame. Alternatively, the AID information on the Duration/ID field is not used and the ordinary BA or ACK frame for the single STA may be used and transmitted.

(Variations in UL-MU)

Figure 13B:
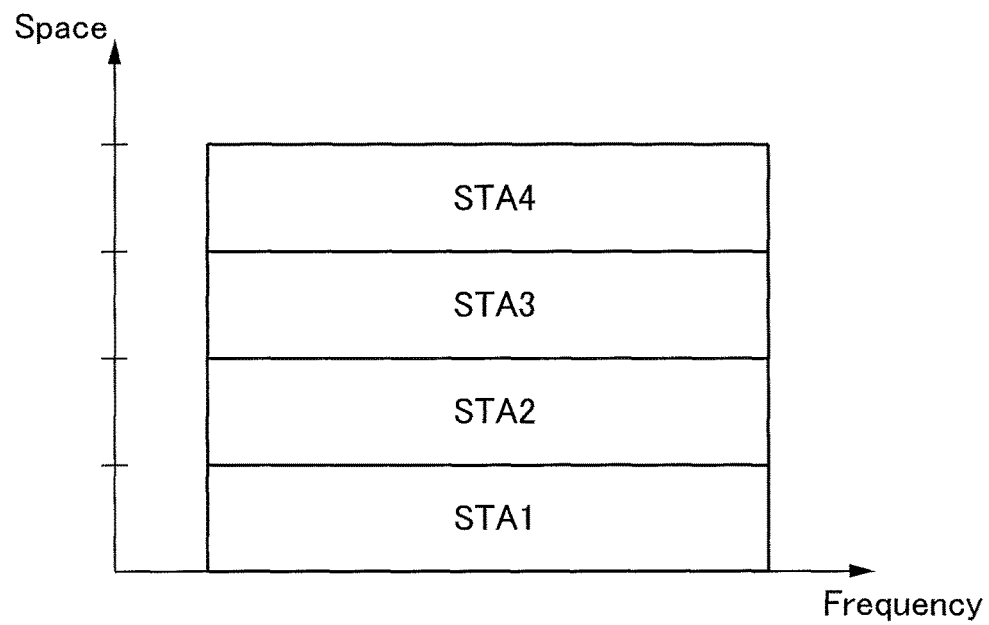
FIG. 13B is an explanatory drawing of MU-MIMO.

In the example of the embodiment, UL-OFDMA is used as UL-MU. UL-MU-MIMO may be used instead. UL-MU-MIMO will be briefly discussed below. In UL-MU-MIMO, the plurality of STAs simultaneously transmit frames to the AP with the same frequency band (spatial multiplexing), thereby increasing the efficiency of uplink transmission. FIG. 13B is an explanatory drawing of the concept of MU-MIMO. It is assumed that an AP 11 performs UL-MU-MIMO with four STAs 1 to 4. STAs 1 to 4 simultaneously transmit frames using the same channel (any bandwidth, e.g., 20 MHz, 40 MHz, or 80 MHz). The AP simultaneously receives these frames but can separate the frames using a preamble signal included in the physical header of each frame, which will be specifically described below.

The AP 11 receives a signal of superimposed frames from STAs transmitted through UL-MU-MIMO. In UL-MU-MIMO, the AP needs to spatially separate the frames of the STAs from signals simultaneously received from the STAs. Thus, the AP 11 uses channel responses of uplink with the STAs. The AP can estimate the channel responses of uplink with the STAs by using the preamble signals in HE Preambles that are added to the beginnings of the frames transmitted by the STAs. The preamble signal may be transmitted using HE-STF or HE-LTF or another field.

The preamble signal includes a known bit string or a known symbol string. The AP 11 estimates the channel response of uplink by using the known bit string, thereby correctly and spatially separating (decoding) the field subsequent to the preamble signal. The channel response can be estimated by a known technique, for example, the ZF (Zero-Forcing) method, the MMSE (Minimum Mean Square Error) method, the maximum likelihood method, or any other methods. The preamble signals of the STAs are orthogonal to each other, allowing the AP 11 to separately identify the preamble signals simultaneously received from the STAs. Thus, the AP11 can estimate the channel of uplink from each of the STAs to the AP 11 by using each of the preamble signals for the respective STAs.

Subsequent to the preamble signals, different signals are transmitted from the respective STAs. These signals can be separated using the estimated channel responses.

The preamble signals of the STAs can be orthogonalized by any one of temporal, frequency, and coding methods. In the case of time orthogonalization, a field for the preamble signal is divided into plurality of sections and the preamble signals of the STAs are transmitted through the different sections. In one of the sections, only one of the STAs transmits the preamble signal. In other words, while one of the STAs transmits the preamble signal, other STAs do not transmit any signals at that time. In the case of frequency orthogonalization, the preamble signal is transmitted at a frequency where the STAs are orthogonal to each other. In the case of coding orthogonalization, the STAs transmit signals including value strings (more specifically, symbol strings for the value strings) in different rows (or different columns) of an orthogonal matrix. The rows (or columns) of the orthogonal matrix are orthogonal to each other. In all of the orthogonalization methods, the AP 11 can identify the preamble signals of the STAs.

To allow the STAs to use the preamble signals orthogonal to each other, the AP needs to provide information on the preamble signals used by the STAs and the transmission method. Specifically, in the case of time orthogonalization, information on timing of transmission of the preamble signals is necessary (the preamble signals may be identical or different among the STAs). In the case of frequency orthogonalization, information on the transmission frequencies of the preamble signals is necessary (the preamble signals may be identical or different among the STAs). In the case of coding orthogonalization, information on coding patterns (patterns of any rows or columns of the orthogonal matrix) for transmitting the preamble signals is necessary. The preamble signals orthogonal to each other corresponds to resources used by the STAs in UL-MU-MIMO. On the other hand, the resources used by the STAs in UL-OFDMA corresponds to the above described RUs (resource units).

Basically, the format in FIG. 5 can be similarly used for the frames transmitted through UL-MU-MIMO. Moreover, in the case of UL-MU-MIMO, spatial division is used instead of frequency division. Thus, the configuration of the trigger frame may be appropriately changed according to the difference. For example, in the format of the trigger frame in UL-OFDMA (FIG. 6), the RU allocation information field may be changed to the SS allocation field. In the SS allocation field, information may be set for the STA on determination of streams used by the own device, for example, information for specifying a stream allocated to the STA, the number of streams, and so on. For example, information for specifying the preamble signal or the transmission method may be set. In the RU pattern field, information may be set for specifying one of patterns of a set of preamble signals, a set of transmission methods, or a set of combinations of the signals and methods. Alternatively, information for identifying which one of the temporal, frequency, and coding transmission methods is used may be set in the RU pattern field. Moreover, other kinds of information may be set. The operations and sequence in FIG. 8 and the subsequent drawings are illustrated for UL-OFDMA. In the case of UL-MU-MIMO, the operations and sequence can be similarly applied by replacing the above explained expressions of frequency division with expressions corresponding to spatial division.

In a trigger frame under a combined scheme of UL-OFDMA and UL-MU-MIMO (UL-OFDMA & UL-MU-MIMO), information necessary for performing the UL-OFDMA and UL-MU-MIMO may be set in the trigger frame. The operations and sequence in FIG. 8 and the subsequent drawings are illustrated for UL-OFDMA. In the case of UL-OFDMA & UL-MU-MIMO, frequency division and spatial division are used and thus the operations and sequence can be similarly applied by replacing the above explained expressions with expressions corresponding to frequency and spatial divisions. In UL-OFDMA & MU-MIMO, for each resource unit, a plurality of terminals use the same resource unit to make MU-MIMO transmission. For the terminals using the same resource unit, the different preamble signals, transmission methods, or combinations thereof are used for UL-MU-MIMO transmission. The same preamble signal may be used between the terminals among resource units.

Second Embodiment

The present embodiment is characterized in that an AP stores a table of correspondence between MAC addresses and AIDs, for STAs specified by a trigger frame, in a memory or the like at a time of trigger frame transmission, and the AID is specified from the table based on the MAC address included in the frame when the frame is received from the STA through UL-MU transmission.

The AP only needs to identify the AID set in the transmitted Multi-STA BA frame and thus does not need to store all the AIDs beforehand. When a controller 339 instructs a trigger generator 331 to generate a trigger frame, information of pairs of the AIDs and the MAC addresses of the STAs, for which transmission is permitted by the trigger frame, are transferred to an ID manager 333, which are extracted from information on correspondence between the AIDs and the MAC addresses of all the STAs. This information is managed by, for example, the management unit of, for example, firmware that manages the MAC layer processor 330. Access to the firmware requires a longer time period than the memory.

For example, the ID manager 333 obtains the following information from firmware or the like and stores the information as an AID information table in the memory as follows:

MAC address 1 (STA1) —AID1
MAC address 2 (STA2) —AID2
MAC address 3 (STA3) —AID3
MAC address 4 (STA4) —AID4

Figure 14:
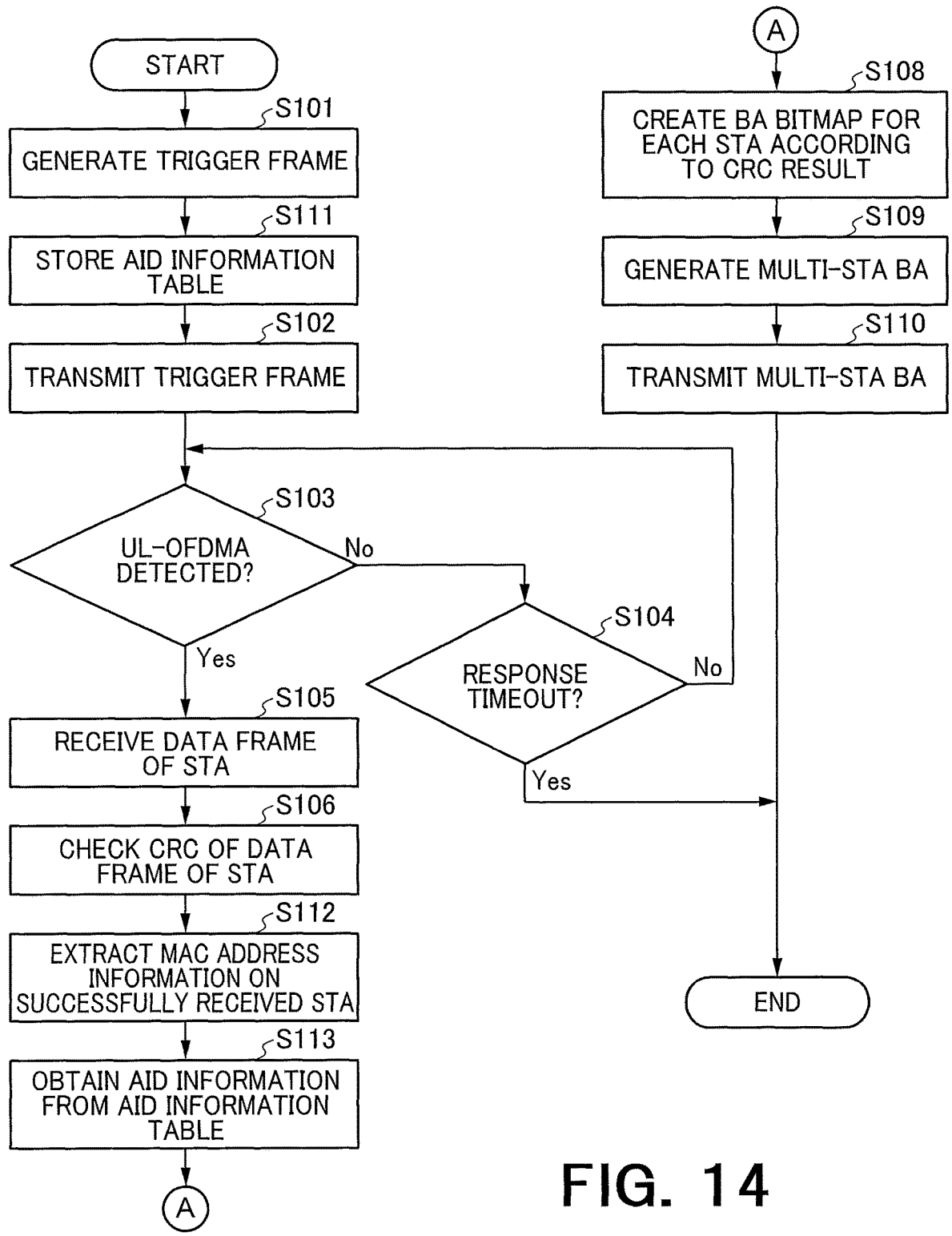
FIG. 14 is a flowchart showing an operation example of an access point according to a second embodiment.

FIG. 14 shows an AP processing flow according to the present embodiment. Steps S111, S112, and S113 are added as a difference from the AP processing flow of the first embodiment. After the trigger frame is generated, the AP generates information on correspondence between MAC addresses and AIDs (AID information table) only for the STAs specified by the trigger frame, and then manages the information in an ID manager 1133.

When the AP receives a QoS Data frame transmitted from the STA through UL-OFDMA, a frame analyzer 334 extracts a MAC address from the Address 2 field of the QoS Data frame after CRC check (S112).

The frame analyzer 334 transfers the extracted MAC address to the ID manager 1133. The ID manager 1133 obtains an AID corresponding to the MAC address, by using the AID information table stored at the transmission of the trigger frame (S113). The ID manager 1133 outputs the obtained AID to a response frame generator 332.

The response frame generator 332 generates a Multi-STA BA frame from BA Bitmap information and the AID, and then transmits the frame (S108 to S110).

In a terminal-side operation, the AID of the STA does not need to be set in a Duration/ID field of the QoS Data frame transmitted through UL-OFDMA. The other operation except for the AID being not set is identical to that of the first embodiment. The reason why the setting of the AID by the STA is not necessary is that the AP holds the AID information table including correspondence between MAC addresses and AIDs.

(The Effect of the Second Embodiment)

According to the present embodiment, a size of information stored in the AID information table is restricted depending on the AIDs and the MAC addresses of the STAs specified by the trigger frame, that is, the number of STA multiplexed in UL-MU. In most cases, the number of STA multiplexed in UL-MU is smaller than the number of STAs which can be connected to the AP. This can reduce the capacity of the memory and considerably shorten an AID retrieval time.

Third Embodiment

In the first embodiment, the ID (AID) of the STA for UL-MU transmission to the trigger frame is set for the resource unit (RU). Meanwhile, in a different scheme, the ID of a specific STA may not be set for the resource unit (RU) in the trigger frame and the STAs are permitted to access any source unit (RU). This scheme is called OFDMA based random access.

In this scheme, the STAs generate random numbers and reduce the generated numbers according to a certain rule. The STA having reached a specific value (in this case, 0) or less acquires a right to select a RU, and can select a RU from the RUs permitted and access (transmit frame(s) through) the RU selected for OFDMA based random access. In a method under the certain rule, for example, each time the trigger frame is received, the number of RUs permitted for OFDMA based random access in the trigger frame is subtracted from the random number in each STA. Alternatively, a value equivalent to the number of reception of the trigger frame is subtracted from the random number in each STA. Alternatively, other methods may be used.

Figure 15:
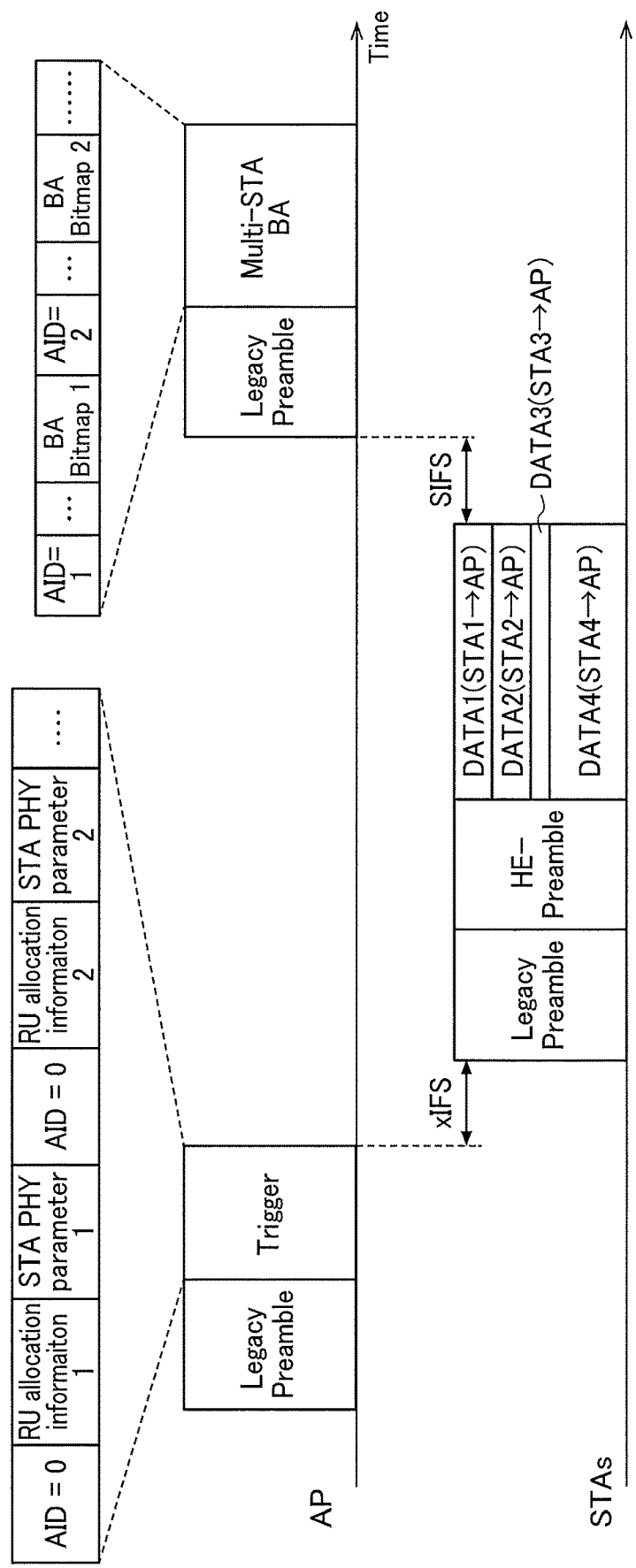
FIG. 15 shows a frame sequence example based on OFDMA-based random access according to a third embodiment.

FIG. 15 shows a frame sequence example according to the third embodiment. For RUs where the STA is permitted to access through OFDMA based random access, an AID having a predetermined value is set in the trigger frame. Currently, 0 is not used as an AID value and thus 0 serving as the predetermined value is used as a value for specifying RU for permitting OFDMA based random access. Values other than 0 may be used. Alternatively, information indicating permission of OFDMA based random access may be set in a Common Info field.

It is assumed that regarding STA1, STA2, STA3, and STA4 using OFDMA based random access, STA1 determines transmission at RU allocation information 1, STA2 determines transmission at RU allocation information 2, STA3 determines transmission at RU allocation information 3, and STA4 determines transmission at RU allocation information 4. At this point, STA1 to STA4 set the AIDs (1 to 4) of the own devices in Duration/ID fields of the frames (DATA1 to DATA4) transmitted by STA1 to STA4, respectively.

The AP extracts the AID set in the Duration/ID field of the data frame received from each STA and sets the extracted AID in an AID field of a Per STA Info field in a Multi-STA BA frame for each STA. The STA, e.g., STA1, having received the Multi-STA BA frame detects the Per STA Info field where AID=1 of the Multi-STA BA frame is set, thereby recognizing successful transmission of the own terminal. Moreover, BA Bitmap1 for AID=1 is confirmed so as to identify acknowledgement information on the transmitted frames (e.g., subframes in an Aggregate frame).

(The Effect of the Third Embodiment)

In the case of OFDMA based random access, when the trigger frame is transmitted, the AP cannot recognize which one of the STAs transmits the frame. However, since the AID is set in the Duration/ID field of the frame transmitted by the STA, the AP can rapidly specify, even in OFDMA based random access, the AID of the STA having transmitted the frame from the received frame, and generate and return the Multi-STA BA frame.

Fourth Embodiment

Figure 16:
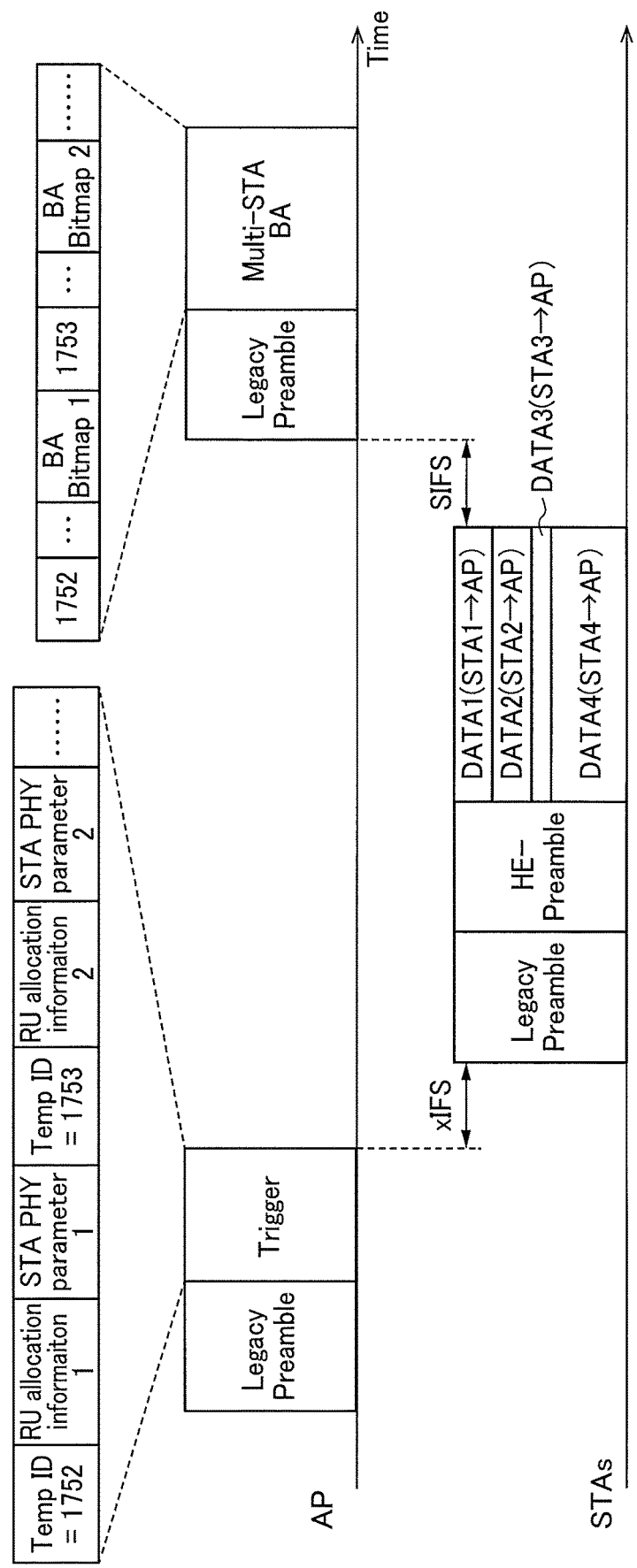
FIG. 16 shows a frame sequence example when a temporary ID is used in OFDMA-based random access according to a fourth embodiment.

Of 11-bit values of AIDs, for example, 1 to 1751 of 1 to 2007 currently used as AIDs are allocated to STAs connected to an AP, and values from 1752 to 2007 are used as temporary IDs, which corresponds identifiers according to the present embodiment. While current AIDs range from 1 to 2007, the number of bits expressing AIDs in a Duration/ID field is 14 bits and values from 2008 to 16383 are reserved for future expansion. Therefore, these values (or a part of the values) may be used as temporary IDs alternatively. In the case of transmission in OFDMA based random access, the STA sets, in the Duration/ID field of a frame, the temporary ID associated with an RU allowing random access, and then the STA transmits the frame. FIG. 16 shows a frame sequence example according to a fourth embodiment. The RU with the allocated temporary ID can be used for OFDMA based random access.

When a trigger frame is generated, the AP selects the temporary ID as an ID to be set in each Per User Info field, and then sets the ID in each Per User Info field. Moreover, information for specifying RU is set in each Per User Info field. For example, the information is set in Per User Info 1 to Per User Info 4 fields as follows:

Per User Info 1: (Temp ID=1752, RU allocation information 1)
Per User Info 2: (Temp ID=1753, RU allocation information 2)
Per User Info 3: (Temp ID=1754, RU allocation information 3)
Per User Info 4: (Temp ID=1755, RU allocation information 4)
where "Temp ID" is a temporary ID.

The AP transmits the trigger frame including the Per User Info 1 to Per User Info 4 fields (FIG. 16). The AP generates a table of correspondence between Temp IDs and RU allocation information (temporary ID information table) immediately after the transmission of the trigger frame, and then the AP stores the table in an ID manager 333.

A STA1 determines transmission based on RU allocation information 1 according to the OFDMA based random access, and transmits a DATA1 frame based on RU allocation information 1 (See FIG. 16). STA1 extracts Temp ID1=1752 from the Per User Info 1 field of the trigger frame received from the AP, and stores the extracted temporary ID in an ID manager 1133. STA1 does not need to include any one of TempID2 (=1752) and the AID of STA1 in the Duration/ID field of the DATA1 frame.

Similarly, a STA2 determines transmission based on RU allocation information 2 and transmits a DATA2 frame based on RU allocation information 2 (FIG. 16). Temp ID2=1753 is stored in the ID manager 1133. STA2 does not need to include any one of TempID2 (=1753) and the AID of STA2 in the Duration/ID field of the DATA2 frame.

A STA3 determines transmission based on RU allocation information 3 and transmits a DATA3 frame based on RU allocation information 3 (FIG. 16). Temp ID3=1754 is stored in the ID manager 1133. STA3 does not need to include any one of TempID3 (=1754) and the AID of STA3 in the Duration/ID field of the DATA3 frame.

A STA4 determines transmission based on RU allocation information 4 and transmits a DATA4 frame based on RU allocation information 4 (FIG. 16). Temp ID4=1755 is stored in the ID manager 1133. STA4 does not need to include any one of TempID4 (=1755) and the AID of STA4 in the Duration/ID field of the DATA4 frame.

The temporary ID stored in the ID manager 1133 in each STA is used as an index when the STA obtains BA Bitmap information from a Multi-STA BA frame.

(The AP Generates and Transmits Multi-STA BA)

A frame analyzer 334 of the AP obtains data frames received by RUs, along with information on RU allocation information from a demodulator 310. The frame analyzer 334 recognizes that the DATA1 frame for STA1 is allocated to RU allocation information 1. Subsequently, the ID manager 333 identifies the temporary ID of RU allocation information 1 as 1752 from the information table stored during the transmission of the trigger frame. Thus, the temporary ID of BA Bitmap1 for setting the acknowledgement information of the DATA1 frame is 1752 and a response frame generator 332 includes, for example, ID=1752 and BA Bitmap1 in Per STA Info 1.

Per STA Info 2 to Per STA Info 4 fields for STA2 to STA4 are also similarly generated.

The AP transmits the generated Multi-STA BA frame after a lapse of SIFS from UL-MU reception (FIG. 16). After transmitting the Multi-STA BA frame, the AP can link the MAC address extracted from the RA field of the received UL-MU frame to the temporary ID and update the reception status of the corresponding MAC address by the record of the BA Bitmap.

STA1 to STA4 receive the Multi-STA BA frame transmitted from the AP.

STA1 searches for a Per STA Info field matching ID=1752 that is stored when the DATA1 frame is transmitted. STA1 recognizes that Per STA Info 1 field has a matching ID. STA1 obtains BA Bitmap1 in Per STA Info 1 field and confirms the acknowledgement information of the DATA1 frame. STA2 to STA4 also perform the same processing as STA1.

(The Effect of the Fourth Embodiment)

If the AP transmits the trigger frame using OFDMA based random access, the temporary ID is allocated to the RU using OFDMA based random access. The AP can create a table of the resource units (RUs) and temporary IDs (temporary ID information table) at the time of transmission of the trigger frame.

If the frames are received from the STA through UL-OFDMA, the AP can identify the RU where the frames were received. Thus, the value of the temporary ID can be specified from the RU where the frames were received. This can rapidly specify the ID (temporary ID) included in the Per STA Info field for the STA.

Therefore, the Multi-STA BA frame can be generated only by implementation on the AP without the need for setting the ID (temporary ID) in the Duration/ID field by the STA. This can eliminate the need for obtaining, from firmware or the like, a table of the AIDs and the MAC addresses of all the STAs connected to the AP, and storing the table in a memory, thereby reducing the capacity of the memory. Even if the number of STAs connected to the AP increases, a retrieval time of the ID (temporary ID) can be considerably reduced.

Furthermore, by this embodiment, even when the STA has not been connected to the AP and has not been assigned an AID, frame exchange between the STA and the AP can be achieved through OFDMA based random access.

Fifth Embodiment

According to the fourth embodiment, in the case of transmission from different STAs with the same RU, the STAs for transmission with the same RU identify the same temporary ID as an ID for specifying BA Bitmap of the own device. If the AP has received the frame of one of the STAs, a Multi-STA BA frame is returned using the temporary ID of the RU having received the frame. However, the plurality of STAs identify the temporary ID as the ID of the own device and thus erroneously identify the ID as BA Bitmap of the own device. In a fifth embodiment, UL-OFDMA transmission based on a scheme using the temporary ID (temporary ID allocating scheme) is carried out to cause the STA to report the buffer status of the own device to the AP. In this case, the buffer status includes information on the existence or non-existence of a data transmission request of the STA. For example, the buffer status includes information on whether the STA has a data frame to be transmitted. If the STA has data, the buffer status may include information on the amount of data.

Figure 17:
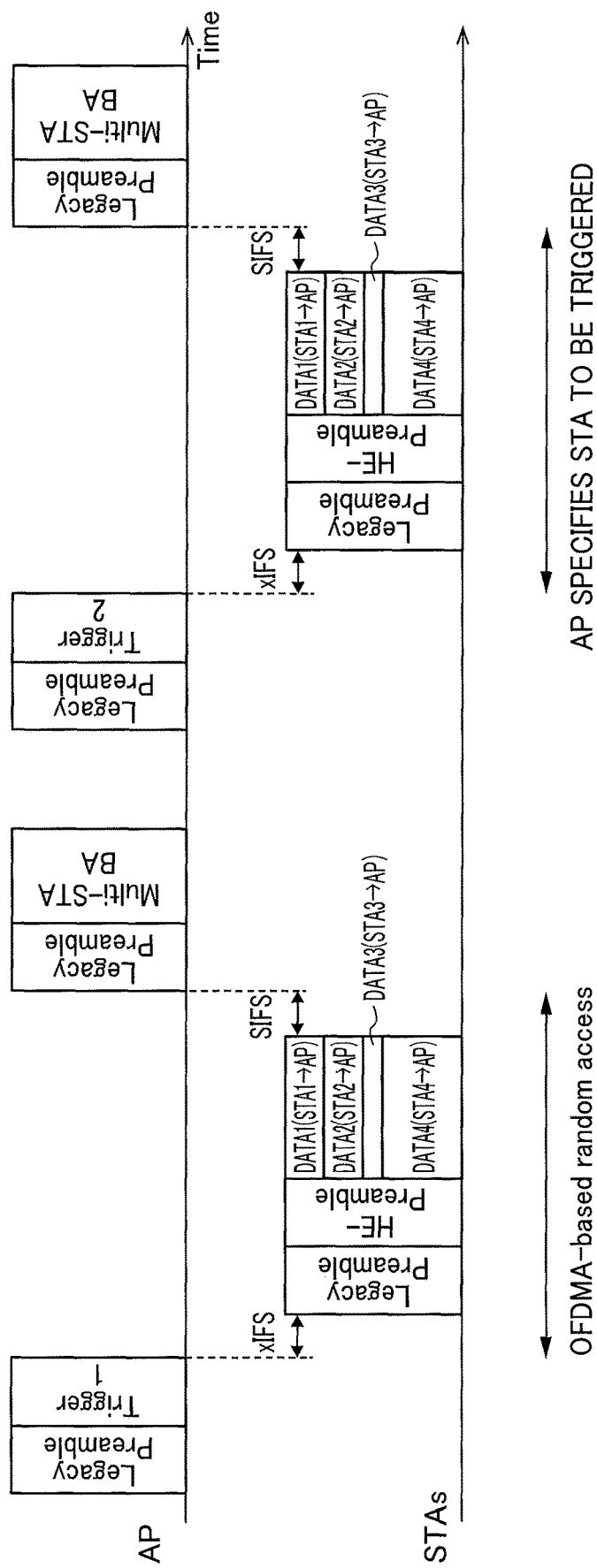
FIG. 17 shows a frame sequence example of a notification of a buffer status in OFDMA-based random access according to a fifth embodiment.

FIG. 17 shows a frame sequence example according to a fifth embodiment.

As in the fourth embodiment, the AP generates a Trigger1 frame and transmits the Trigger1 frame according to a temporary ID allocation scheme. The Trigger1 frame includes correspondence between temporary IDs and RU allocation information. For example, a frame used for the STA to report a buffer status may be a QoS Null frame and information for specifying the use of the frame may be included in the Trigger1. The QoS Null frame has a MAC header but has a format without a frame body field.

Each STA having received the trigger frame generates the QoS Null frame including information on the buffer status of the own device, and transmits the QoS Null frame through optionally selected one of the RUs having temporary IDs allocated by the trigger frame.

The AP determines the STAs permitted to transmit data frames based on information on buffer statuses from the STAs. In order to permit transmission of the determined STAs, the AIDs of the STAs are included in a Trigger2 frame (the STAs permitted to transmit data frames are specified in the Trigger2 frame).

In a Duration/ID field of a data frame transmitted by each STA specified by the Trigger2 frame, each STA sets the AID of the own device as in the first embodiment.

In this case, if STA4 and STA5 transmit buffer statuses with the same RU and the AP successfully receives the buffer status from STA4 but does not receive the buffer status from STA5, STA4 and STA5 having received the Multi-STA BA frame transmitted by the AP identify the same temporary ID as the ID of the own device. Thus, both of the STAs recognize a response to the own device from the AP. However, the AP permits the transmission of the STAs including STA1 to STA4 according to the Trigger2 frame, and thus when receiving the Trigger2 frame, STA5 recognizes afterward that a buffer status transmitted by STA5 has not been received by the AP. Unlike in the fourth embodiment, the STA does not erroneously recognize that the AP has received the data frame transmitted by the STA with no problem.

Sixth Embodiment

In the present embodiment, the number of entries of pairs of MAC addresses and AIDs is limited that are stored in the table of an ID manager 333 in OFDMA-based random access, and a BA Bitmap response is not made to a frame from a STA that was not included in the table. The AID of the STA is specified in the subsequent trigger frame, the transmission of the frame is permitted, and then a BA Bitmap response is made to the frame.

Figure 18:
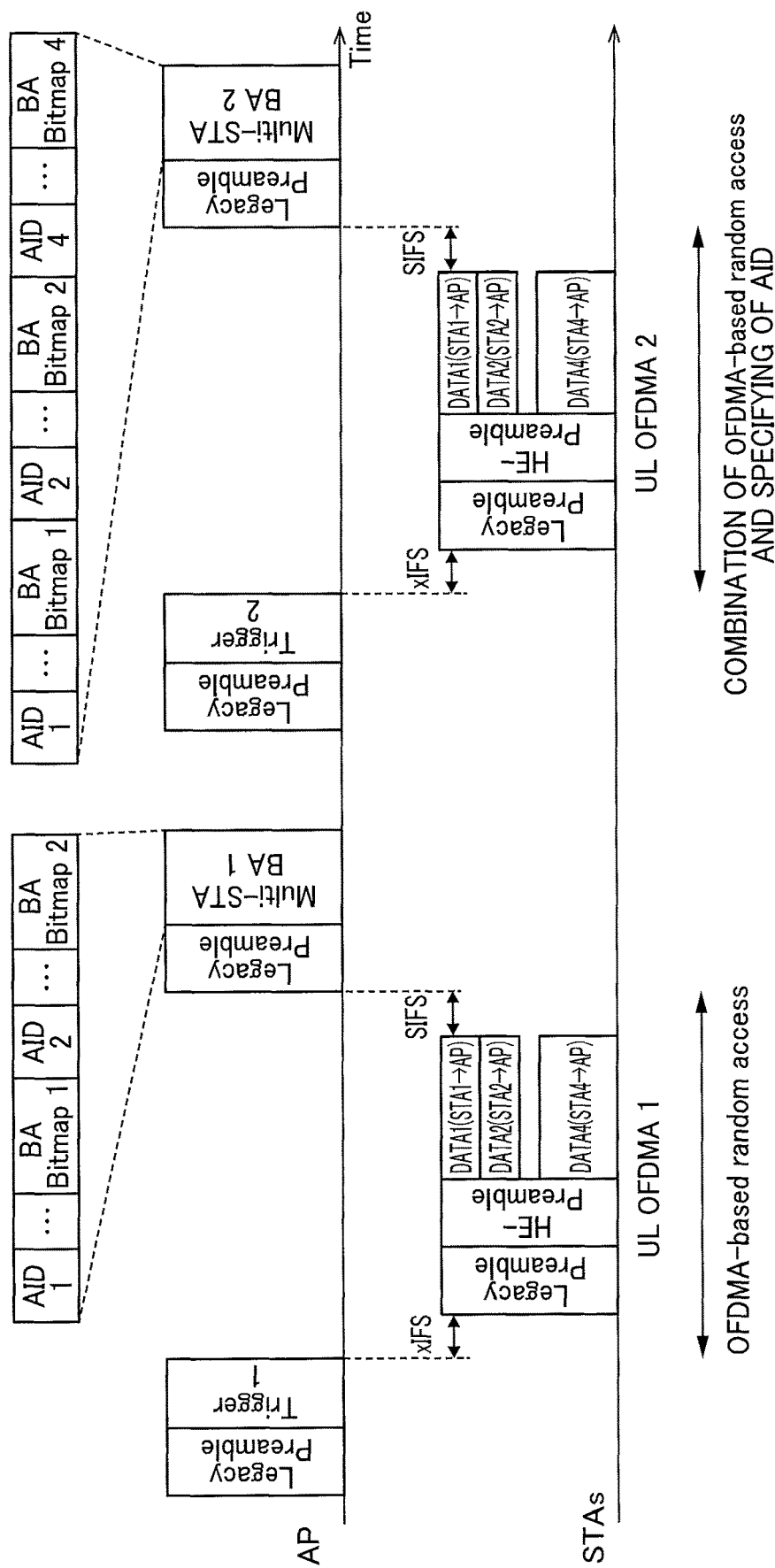
FIG. 18 shows a frame sequence example according to a sixth embodiment.

FIG. 18 shows a frame sequence example according to a sixth embodiment.

The AP transmits a Trigger1 frame in which Per User Info fields include the following AIDs:
AID=0, RU allocation information 1
AID=0, RU allocation information 2
AID=0, RU allocation information 3
AID=0, RU allocation information 4

The setting of AID=0 notifies RU allocation information 1 to 4 accessible through OFDMA-based random access, to the STA having received the Trigger1.

It is assumed that in the AID information table stored in the ID manager 333 of the AP, information is stored as follows: MAC addresses 1 to 3 are the MAC addresses of STA1 to STA3, and AID1 to AID3 are the AIDs of STA1 to STA3. Information registered in the AID information table may be those of the STAs selected by any method such as, for example, STAs which have carried out UL-OFDMA immediately before. Alternatively, STAs that are likely to make UL-OFDMA transmission may be selected by any method. The STAs may be selected by other methods.
MAC address 1—AID1
MAC address 2—AID2
MAC address 3—AID3

It is assumed that in response to a Trigger1 frame transmitted from the AP, STA1, STA2, and STA4 transmit a DATA1 frame, a DATA2 frame, and a DATA4 frame, respectively (UL-OFDMA1). At this point, STA1 to STA4 do not need to set the AID of the own device in a Duration/ID field. The ID manager 333 of the AP stores the AIDs and MAC addresses of STA1 and STA2 but does not store the AID and MAC address of STA4.

The AP specifies only the AIDs of STA1 and STA2 stored in the ID manager 333, based on the MAC addresses of STA1 and STA2, and then creates BA Bitmap thereof. A Multi-STA BA1 frame is generated in which Per STA Info 1 field includes AID1 and BA Bitmap1 and Per STA Info 2 field includes AID2 and BA Bitmap2. Since the AID of STA4 is not stored in the ID manager 333, the AP does not return BA Bitmap to STA4 at this point. However, the AID and MAC address of STA4 are managed by, for example, firmware operated in the AP.

Since the MAC address 4 is not included in the AID information table, the AP updates the AID information table of the ID manager 333 in the AP as follows: the AID3 and MAC address 3 of STA3 are deleted and the AID and MAC address of ST4 are added (assuming that only three pairs of AIDs and MAC addresses can be stored).
MAC address 1—AID1
MAC address 2—AID2
MAC address 4—AID4

The AP transmits a Trigger2 frame having the Per User Info fields including:
AID=0, RU allocation information 1
AID=0, RU allocation information 2
AID=0, RU allocation information 3
AID=AID4, RU allocation information 4

For RU allocation information 1 to 3 set with AID=0, accessibility through OFDMA-based random access is specified as in the case of the Trigger1 frame. Meanwhile, for RU allocation information 4, AID4 is specified instead of 0. The AP was unable to return BA Bitmap to the DATA4 frame transmitted through UL-OFDMA1 but can return BA Bitmap to STA4 this time, and thus an opportunity is provided to transmit the DATA4 frame after the Trigger2 frame.

It is assumed that STA1, STA2, and STA4 transmit the DATA1 frame, the DATA2 frame, and the DATA4 frame, respectively, out of STAs having received the Trigger2 frame (UL-OFDMA2). The DATA1, DATA2, and DATA4 frames transmitted through UL-OFDMA2 may be identical to or different from the DATA1, DATA2, and DATA4 frames transmitted through UL-OFDMA1. The ID manager 333 of the AP stores the AIDs and the MAC addresses of STA1, STA2, and STA4. When, in a more general expression, the STAs or the AP chronologically transmits a plurality of X-th frames, the contents of the X-th frames may be identical to or different from one another. If the STAs multiplex the X-th frames, the contents of the X-th frames may be identical to or different from one another. The X has any value.

The AP creates BA Bitmap for STA1, STA2, and STA4 stored in the ID manager 333. Specifically, AID1 and BA Bitmap1 are set in Per STA Info 1 field, AID2 and BA Bitmap2 are set in Per STA Info 2 field, and AID4 and BA Bitmap4 are set in Per STA Info 3 field so as to generate a Multi-STA BA2 frame. The AP transmits the Multi-STA BA2 frame after a lapse of SIFS from the completion of reception of UL-OFDMA2.

(The Effect of the Sixth Embodiment)

In the second embodiment, it is assumed that the AP identifies the AID of the STA for UL-OFDMA transmission when the trigger is transmitted. In the sixth embodiment, however, the AIDs of all or part of the STAs for UL-OFDMA transmission may not be registered in a table managed by the ID manager 333. If the AID of the STA is unregistered in the table and thus no response is made from the STA, the table is then updated to register the AID of the STA. In the subsequent trigger frame, the AID of the STA can be directly specified to preferentially allocate a RU. In the case of OFDMA-based random access, the number of entries to be registered in the table can be limited to the number of multiplexed UL-MU frames. This can reduce the capacity of a memory that stores a table of correspondence between the MAC addresses and AIDs of the STAs under the management of the ID manager 333. Even if the number of STAs connected to the AP increases, an AID retrieval time of the AP can be considerably reduced.

Seventh Embodiment

In the frame sequence shown in FIG. 15 according to the third embodiment, if the value of the AID included in Per User Info in the trigger frame is 0, OFDMA-based random access is used when the STA accesses the RU included in Per User Info. If the STA transmits the data frame using UL-OFDMA, the AID allocated to the STA by the AP in the association process is set in the Duration/ID field. A seventh embodiment, however, is characterized in that an STA does not set an allocated AID but a value (Random ID) randomly generated by the STA is set in a Duration/ID field.

In the foregoing embodiments, in the case of bit[15:11]=5'b11000 in the 16-bit Duration/ID field, bit[10:0] is allocated as an AID (a value of at least 1). In the present embodiment, in order to express the Random ID generated by the STA, the Random ID is, for example, ten lower-order bits in the case of bit[10]=1, whereas the AID is ten lower-order bits in the case of bit[10]=0. The AID and Random ID are shown in the following table. Incidentally, currently preserved bit[11] may be used and bit[10:0] may serve as the AID or the Random ID.

TABLE 1

AID or Random ID in Duration/ID Field

| Duration[15:0] | | | | | |
|---|---|---|---|---|---|
| Bit[15] | Bit[14] | Bit[13:11] | Bit[10] | Bit[9:0] | Remarks |
| 1'b1 | 1'b1 | 3'b000 | 1'b0 | AID | AID of a value equal to 1 or more is allocated to a STA bit[10] is set to 0 to express AID |
| 1'b1 | 1'b1 | 3'b000 | 1'b1 | Random ID | bit[10] is set to 1 to express Random ID |

If a randomly generated value (Random ID) is set in the Duration/ID field of a data frame, the STA sets bit[15:10] of the Duration/ID field at 5'b110001 and then sets the randomly generated value (Random ID) in bit[9:0].

If the Random ID is used, the STA retains the Random ID in an ID manager 1133 until a Multi-STA BA frame is received from the AP.

In the case of bit[15:11]=5'b11000 in the Duration/ID field of the data frame received from the STA, the AP may identify 11 lower-order bits as ID information (AID or Random ID) and set a value, which is extracted from the Duration/ID field, in an AID field in a Per STA Info field of the Multi-STA BA frame. The AP does not need to identify whether an extracted value is the Random ID or the AID when it generates the Multi-STA BA frame. The way to update the corresponding MAC address when the Random ID is used can refer to the way described in the fourth embodiment. In the present embodiment, the Random ID is used instead of the temporary ID which was used in the fourth embodiment.

If the Multi-STA BA frame is received, the STA searches the Per STA Info field of the own device.

If the AID is set in the Duration/ID field when the STA transmits the data frame, the STA searches for a field of bit[10]=0 in the AID field of the Per STA Info field. It is determined whether bit[9:0] in the retrieved field corresponds to the AID of the own device.

If the Random ID is set in the Duration/ID field when the STA transmits the data frame, the STA searches for a field of bit[10]=1 in the AID field of the Per STA Info field. It is determined whether bit[9:0] in the retrieved field corresponds to the Random ID of the own device.

As described above, the STA can identify whether a value set in the AID field of the Per STA Info field is the AID allocated by the AP or the Random ID randomly generated by the STA.

(The Effect of the Seventh Embodiment)

In the case of OFDMA based random access, the AP cannot identify the STA that transmits data when a trigger frame is transmitted. However, according to a method of setting an ID randomly generated by the STA in the Duration/ID field of the frame transmitted by the STA, the Multi-STA BA frame can be generated and returned within SIFS from the completion of reception of UL-OFDMA even in OFDMA based random access. If the STAs generate the same Random ID, the Multi-STA BA may have a plurality of Per STA Info fields including the same Random ID. Thus, it is preferable to use Random ID generation algorithm by which there is no or less probability to generate same Random ID at the STAs.

As by the fourth embodiment, even when the STA has not been connected to the AP and has not been assigned an AID, frame exchange between the STA and the AP can be achieved through OFDMA based random access by this embodiment.

Eighth Embodiment

In the example of the first embodiment, the STA transmits the AID using the Duration/ID field of the MAC frame. The present embodiment will describe a method of setting an AID in a PHY header, particularly in HE-Preamble.

Figure 19:
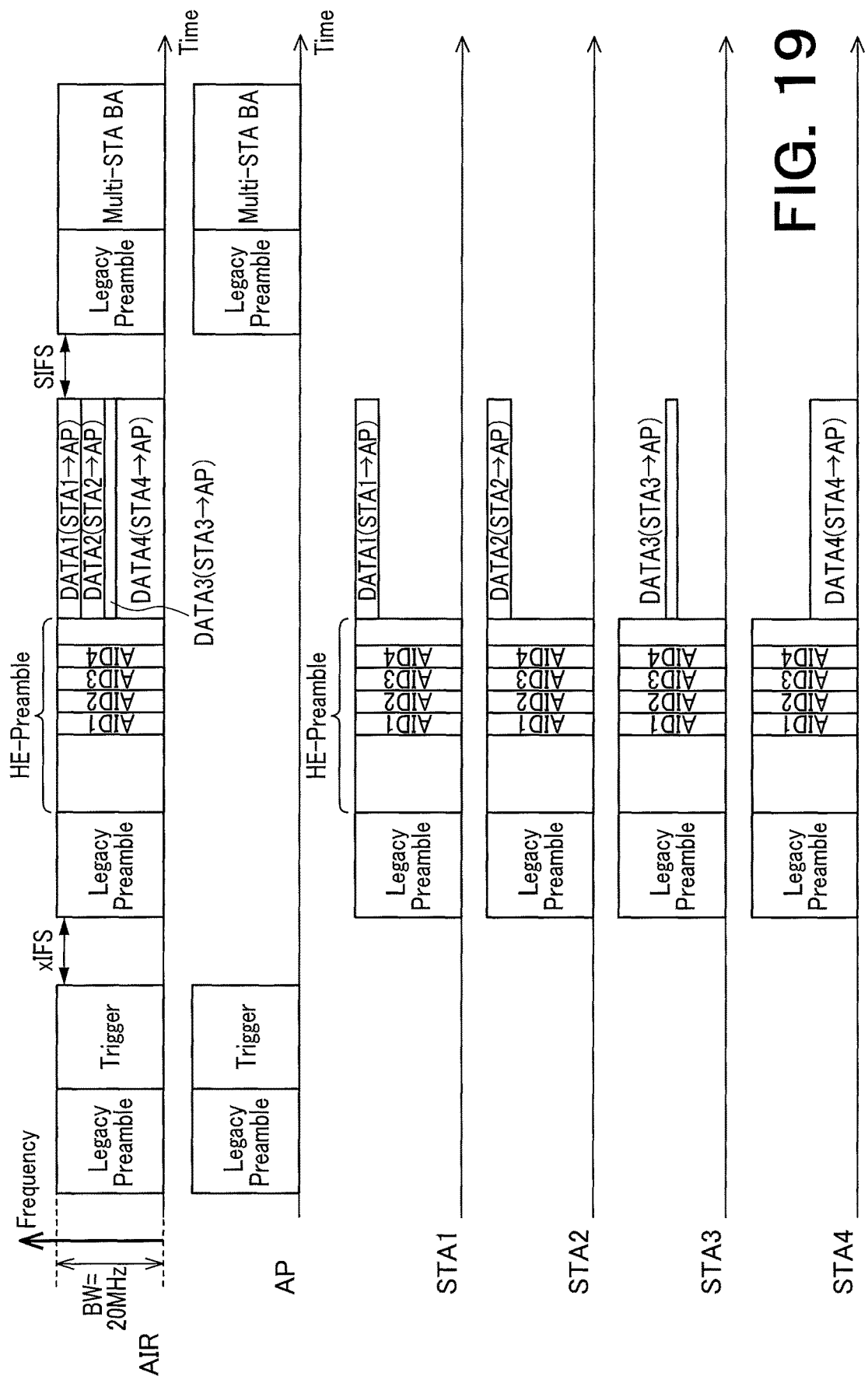
FIG. 19 shows a frame sequence example of ID transmission with a PHY header according to an eighth embodiment.

FIG. 19 shows a first example of a frame sequence according to an eighth embodiment. When receiving a trigger frame, the STAs extract AIDs included in all Per User Info fields as well as the AID of the own device. When the STAs transmit the data frame, all the extracted AIDs included in the PHY header are transmitted. For example, the STAs serially transmit all the AIDs in terms of time. More specifically, the AIDs are transmitted with predetermined fields in a predetermined order. Thus, all the AIDs of the same kind are simultaneously transmitted from the STAs, allowing the AP to successfully receive the AIDs simultaneously transmitted with the same band from the STAs. The PHY header may include a part of the bit string of the AID (Partial AID) instead of the entirety of the bit string of the AID.

Figure 20:
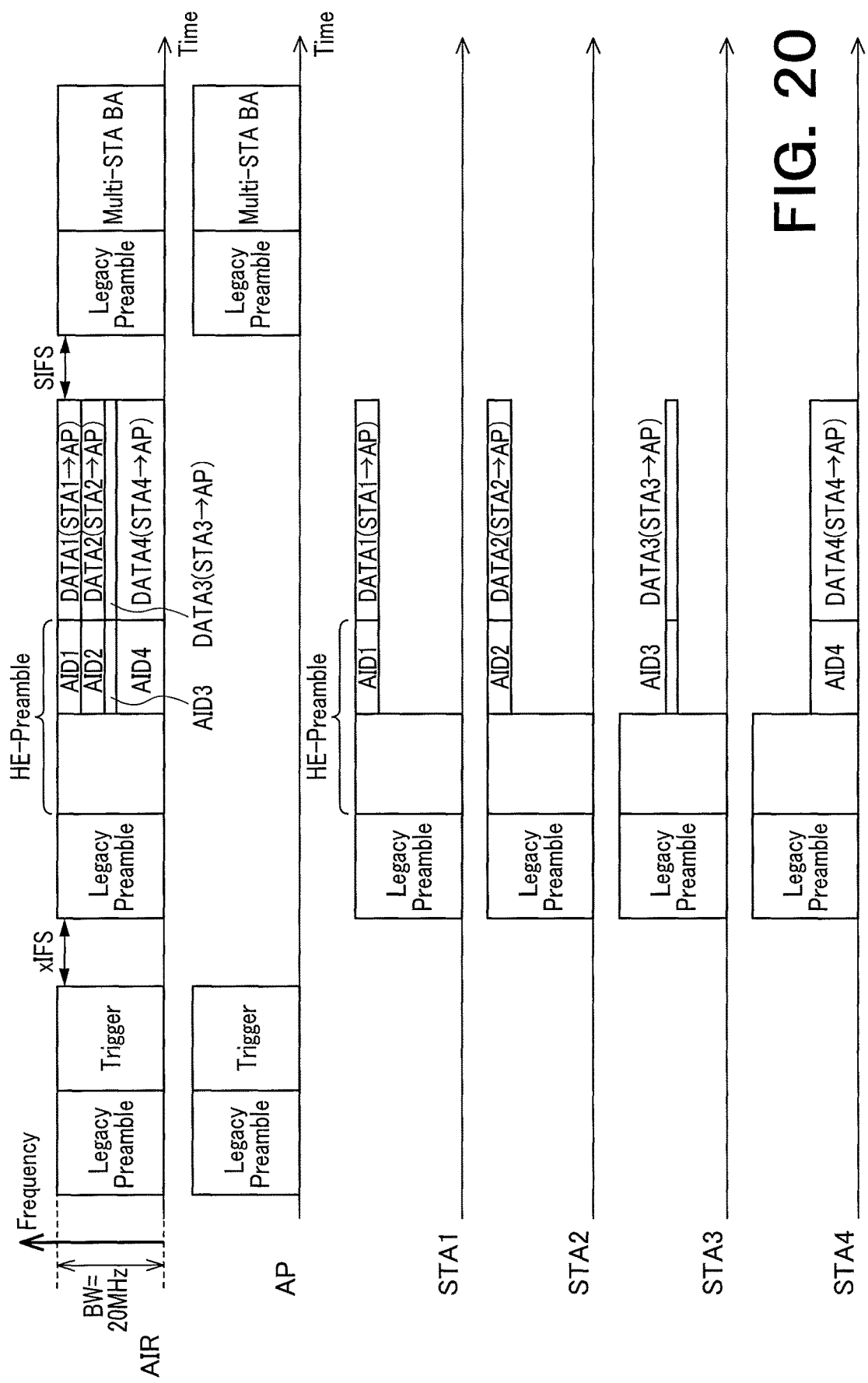
FIG. 20 shows a frame sequence example of ID transmission through a resource unit according to the eighth embodiment.

FIG. 20 shows a second example of the frame sequence according to the eighth embodiment. When receiving a trigger frame, the STAs only extract the AID of the own device from the Per User Info field. When each STA transmit the data frame, only the AID of each STA is transmitted through a predetermined field of HE-Preamble by using the same RU as an RU via which the data frame is transmitted. Specifically, a part of HE-Preamble is transmitted with a channel width (e.g., a 20-MHz band) while the other part (a predetermined field where the AID is set) is transmitted with the band of RU of each STA instead of the 20-MHz band. Incidentally, the predetermined field of HE-Preamble may include a part of the bit string of the AID (Partial AID) instead of the entirety of the bit string of the AID.

Ninth Embodiment

The foregoing embodiments can be optionally combined. The present embodiment shows an example of a combination of the second embodiment and the third embodiment. In this case, a trigger frame transmitted by an AP includes an instruction of transmission through OFDMA based random access and an instruction of allocating a RU to a specific STA. The STA sets an AID in a Duration/ID field only in transmission through OFDMA based random access.

Figure 21:
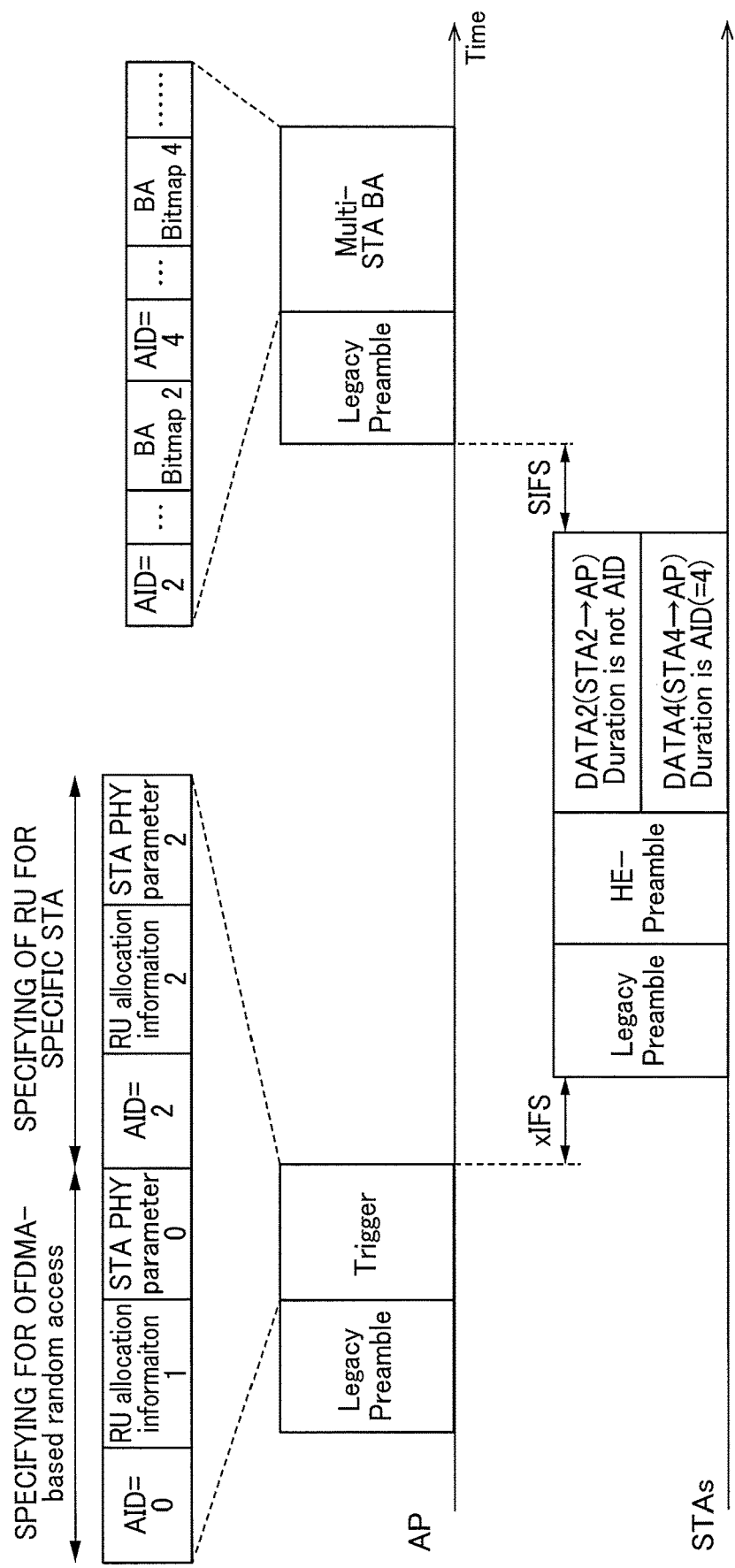
FIG. 21 shows a frame sequence example according to a ninth embodiment.

FIG. 21 shows a frame sequence example according to a ninth embodiment. In the frame sequence, a STA2 (AID 2) is a STA that is allocated the RU in the trigger frame. Moreover, a notification for permitting access to another RU is provided in the trigger frame through OFDMA based random access. In this case, the AID of the another RU has a value of 0 as in the foregoing embodiments.

In this case, when the trigger frame is transmitted, the AP specifies the RU for STA2 and thus the AID of STA2 is specified beforehand. Meanwhile, the STA making OFDMA based random access cannot be identified and thus the AP cannot identify the AID.

In FIG. 21, STA4 transmits a DATA4 frame through UL-OFDMA using information on RU allocation information 0 field and a STA PHY parameter 0 field included in the trigger frame. In the Duration/ID field of a DATA4 frame, the AID of STA4 is set (that is, 4 is set).

Meanwhile, STA2 transmits a DATA2 frame through UL-OFDMA using information on RU allocation information 2 field and a STA PHY parameter 2 field included in the trigger frame. At this point, STA2 does not set an AID in the Duration/ID field of the DATA2 frame because the RU is specified in the trigger frame. A value set in the Duration/ID field may be 0 or a length of a time period until the completion of transmission of a Multi-STA BA frame by the AP.

The AP receives the DATA2 frame and the DATA4 frame from STA2 and STA4 and generates the Multi-STA BA frame. The generation of the Multi-STA BA frame for STA2 requires an AID (in this case, AID 2) stored in an ID manager 333 when the AP transmits the trigger frame. Meanwhile, for STA4, the AID extracted from the Duration/ID field upon the reception of the DATA4 frame (in this case, AID 4) is used for the corresponding AID field in the Multi-STA BA frame. Thus, the AP can generate the Multi-STA BA frame.

Tenth Embodiment

Figure 22:
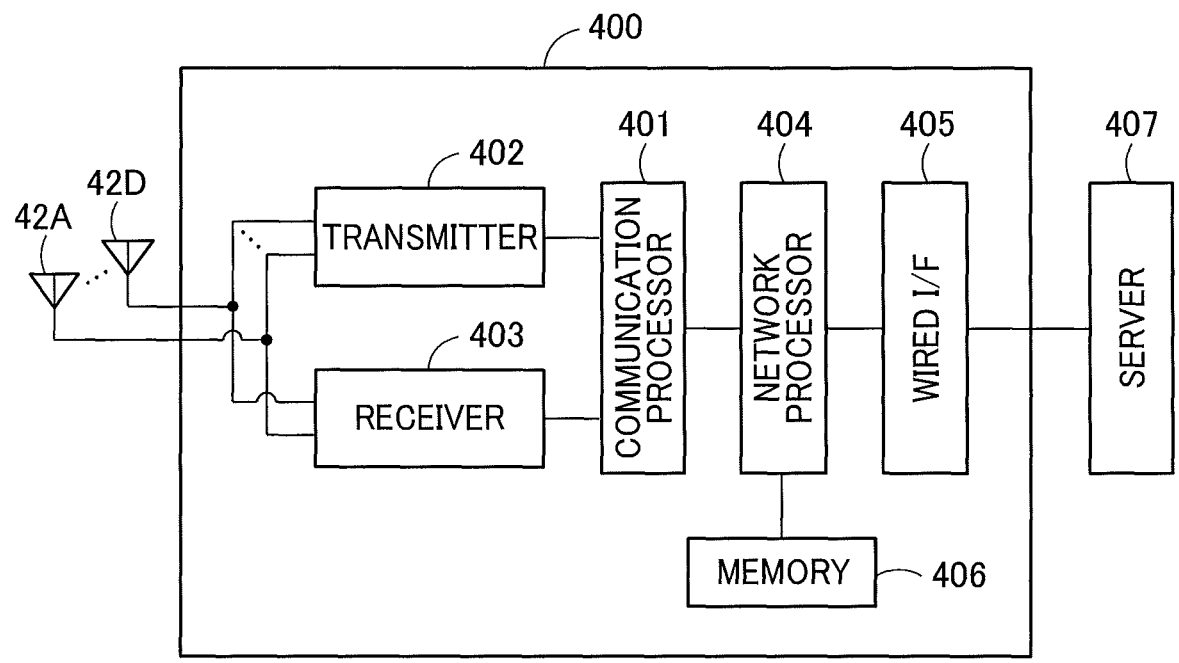
FIG. 22 is a functional block diagram of a base station or a terminal according to a tenth embodiment.

FIG. 22 is a functional block diagram of a base station (access point) 400 according to a tenth embodiment. The access point includes a communication processor 401, a transmitter 402, a receiver 403, antennas 42A, 42B, 42C, and 42D, a network processor 404, a wired I/F 405, and a memory 406. The access point 400 is connected to a server 407 through the wired I/F 405. The communication processor 401 has functions similar to the MAC layer processor 330 described in the first embodiment. The transmitter 402 and the receiver 403 have functions similar to the modulator 320 and the demodulator 310 described in the first embodiment. The network processor 404 has functions similar to the higher processor described in the first embodiment. The communication processor 401 may internally possess a buffer for transferring data to and from the network processor 404. The buffer may be a volatile memory, such as a DRAM, or may be a non-volatile memory, such as a NAND and an MRAM.

The network processor 404 controls data exchange with the communication processor 401, data writing and reading to and from the memory 406, and communication with the server 407 through the wired I/F 405. The network processor 404 may execute an upper communication process of the MAC layer, such as TCP/IP and UDP/IP, or a process of the application layer. The operation of the network processor may be performed through processing of software (program) by a processor, such as a CPU. The operation may be performed by hardware or may be performed by both of the software and the hardware.

For example, the communication processor 401 corresponds to a baseband integrated circuit, and the transmitter 402 and the receiver 403 correspond to an RF integrated circuit that transmits and receives frames. The communication processor 401 and the network processor 404 may be formed by one integrated circuit (one chip). Parts that execute processing of digital domains of the transmitter 402 and the receiver 403 and parts that execute processing of analog domains may be formed by different chips. The communication processor 401 may execute an upper communication process of the MAC layer, such as TCP/IP and UDP/IP. Although the number of antennas is four here, it is only necessary that at least one antenna is included.

The memory 406 saves data received from the server 407 and data received by the receiver 402. The memory 406 may be, for example, a volatile memory, such as a DRAM, or may be a non-volatile memory, such as a NAND and an MRAM. The memory 406 may be an SSD, an HDD, an SD card, an eMMC, or the like. The memory 406 may be provided outside of the base station 400.

The wired I/F 405 transmits and receives data to and from the server 407. Although the communication with the server 407 is performed through a wire in the present embodiment, the communication with the server 407 may be performed wirelessly. In this case, a wireless I/F may be employed instead of the wired I/F 405.

The server 407 is a communication device that returns a response including requested data in response to reception of a data forward request for requesting transmission of the data. Examples of the server 407 include an HTTP server (Web server) and an FTP server. However, the server 407 is not limited to these as long as the server 407 has a function of returning the requested data. The server 407 may be a communication device operated by the user, such as a PC and a smartphone.

When the STA belonging to the BSS of the base station 400 issues a forward request of data for the server 407, a packet regarding the data forward request is transmitted to the base station 400. The base station 400 receives the packet through the antennas 42A to 42D. The base station 400 causes the receiver 403 to execute the process of the physical layer and the like and causes the communication processor 401 to execute the process of the MAC layer and the like.

The network processor 404 analyzes the packet received from the communication processor 401. Specifically, the network processor 404 checks the destination IP address, the destination port number, and the like. When the data of the packet is a data forward request such as an HTTP GET request, the network processor 404 checks whether the data requested by the data forward request (for example, data in the URL requested by the HTTP GET request) is cached (stored) in the memory 406. A table associating the URL (or reduced expression of the URL, such as a hash value and an identifier substituting the URL) and the data is stored in the memory 406. The fact that the data is cached in the memory 406 will be expressed that the cache data exists in the memory 406.

When the cache data does not exist in the memory 406, the network processor 404 transmits the data forward request to the server 407 through the wired I/F 405. In other words, the network processor 404 substitutes the STA to transmit the data forward request to the server 407. Specifically, the network processor 404 generates an HTTP request and executes protocol processing, such as adding the TCP/IP header, to transfer the packet to the wired I/F 405. The wired I/F 405 transmits the received packet to the server 407.

The wired I/F 405 receives, from the server 407, a packet that is a response to the data forward request. From the IP header of the packet received through the wired I/F 405, the network processor 404 detects that the packet is addressed to the STA and transfers the packet to the communication processor 401. The communication processor 401 executes processing of the MAC layer and the like for the packet. The transmitter 402 executes processing of the physical layer and the like and transmits the packet addressed to the STA from the antennas 42A to 42D. The network processor 404 associates the data received from the server 407 with the URL (or reduced expression of the URL) and saves the cache data in the memory 406.

When the cache data exists in the memory 406, the network processor 404 reads the data requested by the data forward request from the memory 406 and transmits the data to the communication processor 401. Specifically, the network processor 404 adds the HTTP header or the like to the data read from the memory 406 and executes protocol processing, such as adding the TCP/IP header, to transmit the packet to the communication processor 401. In this case, the transmitter IP address of the packet is set to the same IP address as the server, and the transmitter port number is also set to the same port number as the server (destination port number of the packet transmitted by the communication terminal), for example. Therefore, it can be viewed from the STA as if communication with the server 407 is established. The communication processor 401 executes processing of the MAC layer and the like for the packet. The transmitter 402 executes processing of the physical layer and the like and transmits the packet addressed to the STA from the antennas 42A to 42D.

According to the operation, frequently accessed data is responded based on the cache data saved in the memory 406, and the traffic between the server 407 and the base station 400 can be reduced. Note that the operation of the network processor 404 is not limited to the operation of the present embodiment. There is no problem in performing other operation when a general caching proxy is used, in which data is acquired from the server 407 in place of the STA, the data is cached in the memory 406, and a response is made from the cache data of the memory 406 for a data forward request of the same data.

The base station (access point) according to the present invention can be applied for the base station in the firsts to ninth embodiments. The transmission of the frame, the data or the packet used in the first to ninth embodiments may be carried out based on the cached data stored in the memory 406. Also, information obtained based on the frame, the data or the packet received by the base station in the firsts to ninth embodiments may be cached in the memory 406. The frame transmitted by the access point in the firsts to ninth embodiments may include the cached data or information based on the cached data. The information based on the cached data may include information on a size of the data, a size of a packet required for transmission of the data. The information based on the cached data may include a modulation scheme required for transmission of the data. The information based on the cached data may include information on existence or non-existence of data addressed to the terminal.

In the present embodiment, although the base station with the cache function is described, a terminal (STA) with the cache function can also be realized by the same block configuration as FIG. 22. In this case, the wired I/F 405 may be omitted. The transmission, by the terminal, of the frame, the data or the packet used in the first to ninth embodiments may be carried out based on the cached data stored in the memory 406. Also, information obtained based on the frame, the data or the packet received by the terminal in the firsts to ninth embodiments may be cached in the memory 406. The information based on the cached data may include information on a size of the data, a size of a packet required for transmission of the data. The information based on the cached data may include a modulation scheme required for transmission of the data. The information based on the cached data may include information on existence or non-existence of data addressed to the access point.

Eleventh Embodiment

Figure 23:
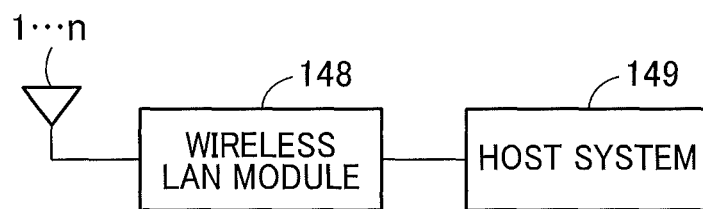
FIG. 23 shows an overall configuration example of a terminal or an access point.

FIG. 23 shows an example of entire configuration of a terminal or a base station. The example of configuration is just an example, and the present embodiment is not limited to this. The terminal or the base station includes one or a plurality of antennas 1 to n (n is an integer equal to or greater than 1), a wireless LAN module 148, and a host system 149. The wireless LAN module 148 corresponds to the wireless communication device according to the above any embodiment. The wireless LAN module 148 includes a host interface and is connected to the host system 149 through the host interface. Other than the connection to the host system 149 through the connection cable, the wireless LAN module 148 may be directly connected to the host system 149. The wireless LAN module 148 can be mounted on a substrate by soldering or the like and can be connected to the host system 149 through wiring of the substrate. The host system 149 uses the wireless LAN module 148 and the antennas 1 to n to communicate with external devices according to an arbitrary communication protocol. The communication protocol may include the TCP/IP and a protocol of a layer upper than that. Alternatively, the TCP/IP may be mounted on the wireless LAN module 148, and the host system 149 may execute only a protocol in a layer upper than that. In this case, the configuration of the host system 149 can be simplified. Examples of the present terminal include a mobile terminal, a TV, a digital camera, a wearable device, a tablet, a smartphone, a game device, a network storage device, a monitor, a digital audio player, a Web camera, a video camera, a projector, a navigation system, an external adaptor, an internal adaptor, a set top box, a gateway, a printer server, a mobile access point, a router, an enterprise/service provider access point, a portable device, a hand-held device, a vehicle and so on.

The wireless LAN module 148 (or the wireless communication device) may have functions of other wireless communication standards such as LTE, LTE-Advanced (standards for mobile phones) as well as the IEEE802.11.

Figure 24:
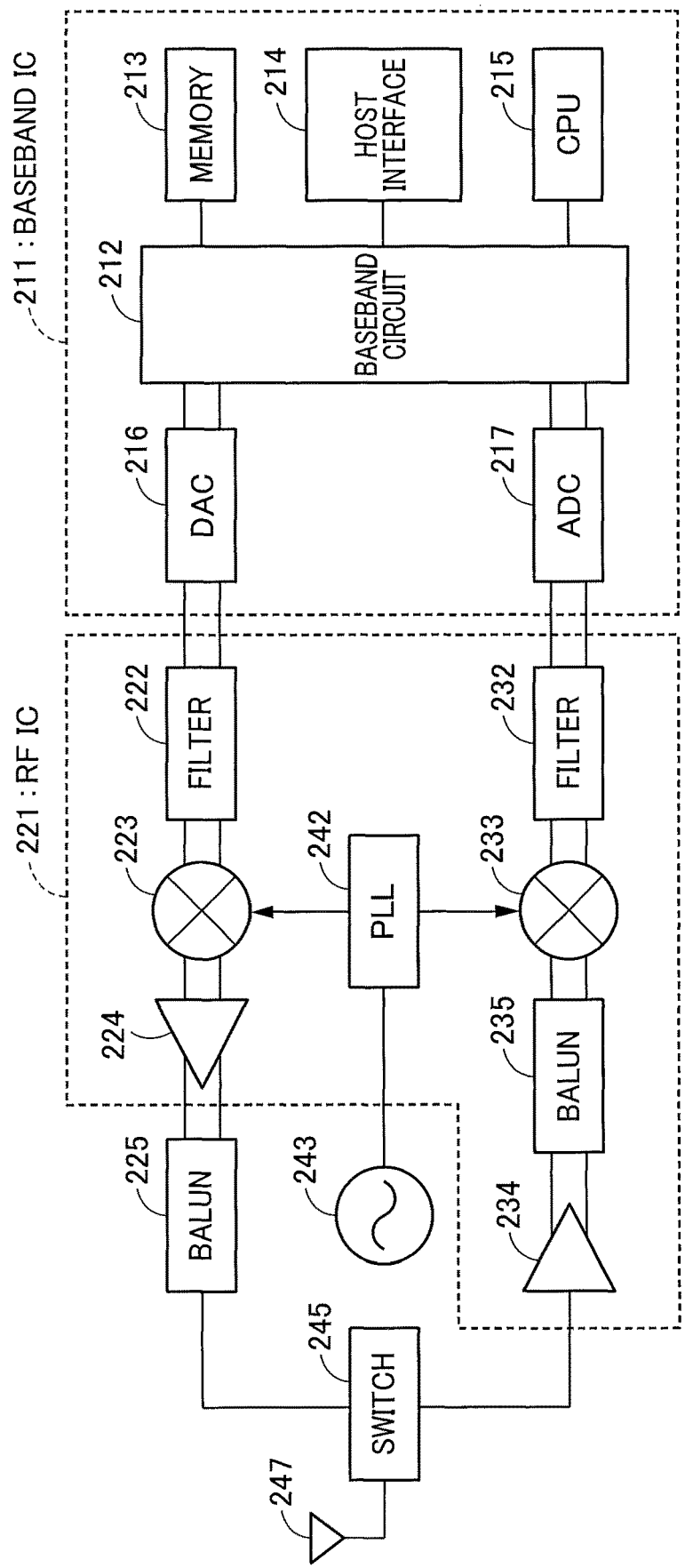
FIG. 24 shows a hardware configuration example of a wireless communication device installed at an access point or a terminal according to an eleventh embodiment.

FIG. 24 shows an example of hardware configuration of a wireless LAN module. The configuration can also be applied when the wireless communication device (or a wireless device) is mounted on either one of the terminal that is a non-base station and the base station. Therefore, the configuration can be applied as an example of specific configuration of the wireless communication device shown in FIG. 8 or 10. At least one antenna 247 is included in the example of configuration. When a plurality of antennas are included, a plurality of sets of a transmission system (216 and 222 to 225), a reception system (232 to 235), a PLL 242, a crystal oscillator (reference signal source) 243, and a switch 245 may be arranged according to the antennas, and each set may be connected to a control circuit 212. One or both of the PLL 242 and the crystal oscillator 243 correspond to an oscillator according to the present embodiment.

The wireless LAN module (wireless communication device or wireless device) includes a baseband IC (Integrated Circuit) 211, an RF (Radio Frequency) IC 221, a balun 225, the switch 245, and the antenna 247.

The baseband IC 211 includes the baseband circuit (control circuit) 212, a memory 213, a host interface 214, a CPU 215, a DAC (Digital to Analog Converter) 216, and an ADC (Analog to Digital Converter) 217.

The baseband IC 211 and the RF IC 221 may be formed on the same substrate. The baseband IC 211 and the RF IC 221 may be formed by one chip. Both or one of the DAC 216 and the ADC 217 may be arranged on the RF IC 221 or may be arranged on another IC. Both or one of the memory 213 and the CPU 215 may be arranged on an IC other than the baseband IC.

The memory 213 stores data to be transferred to and from the host system. The memory 213 also stores one or both of information to be transmitted to the terminal or the base station and information transmitted from the terminal or the base station. The memory 213 may also store a program necessary for the execution of the CPU 215 and may be used as a work area for the CPU 215 to execute the program. The memory 213 may be a volatile memory, such as an SRAM and a DRAM, or may be a non-volatile memory, such as a NAND and an MRAM.

The host interface 214 is an interface for connection to the host system. The interface can be anything, such as UART, SPI, SDIO, USB, and PCI Express.

The CPU 215 is a processor that executes a program to control the baseband circuit 212. The baseband circuit 212 mainly executes a process of the MAC layer and a process of the physical layer. One or both of the baseband circuit 212 and the CPU 215 correspond to the communication control device that controls communication or the controller that controls communication.

At least one of the baseband circuit 212 or the CPU 215 may include a clock generator that generates a clock and may manage internal time by the clock generated by the clock generator.

For the process of the physical layer, the baseband circuit 212 performs addition of the physical header, coding, encryption, modulation process, and the like of the frame to be transmitted and generates, for example, two types of digital baseband signals (hereinafter, "digital I signal" and "digital Q signal").

The DAC 216 performs DA conversion of signals input from the baseband circuit 212. More specifically, the DAC 216 converts the digital I signal to an analog I signal and converts the digital Q signal to an analog Q signal. Note that a single system signal may be transmitted without performing quadrature modulation. When a plurality of antennas are included, and single system or multi-system transmission signals equivalent to the number of antennas are to be distributed and transmitted, the number of provided DACs and the like may correspond to the number of antennas.

The RF IC 221 is, for example, one or both of an RF analog IC and a high frequency IC. The RF IC 221 includes a filter 222, a mixer 223, a preamplifier (PA) 224, the PLL (Phase Locked Loop) 242, a low noise amplifier (LNA) 234, a balun 235, a mixer 233, and a filter 232. Some of the elements may be arranged on the baseband IC 211 or another IC. The filters 222 and 232 may be bandpass filters or low pass filters. The RF IC 221 is connected to the antenna 247 through the switch 245.

The filter 222 extracts a signal of a desired band from each of the analog I signal and the analog Q signal input from the DAC 216. The PLL 242 uses an oscillation signal input from the crystal oscillator 243 and performs one or both of division and multiplication of the oscillation signal to thereby generate a signal at a certain frequency synchronized with the phase of the input signal. Note that the PLL 242 includes a VCO (Voltage Controlled Oscillator) and uses the VCO to perform feedback control based on the oscillation signal input from the crystal oscillator 243 to thereby obtain the signal at the certain frequency. The generated signal at the certain frequency is input to the mixer 223 and the mixer 233. The PLL 242 is equivalent to an example of an oscillator that generates a signal at a certain frequency.

The mixer 223 uses the signal at the certain frequency supplied from the PLL 242 to up-convert the analog I signal and the analog Q signal passed through the filter 222 into a radio frequency. The preamplifier (PA) amplifies the analog I signal and the analog Q signal at the radio frequency generated by the mixer 223, up to desired output power. The balun 225 is a converter for converting a balanced signal (differential signal) to an unbalanced signal (single-ended signal). Although the balanced signal is handled by the RF IC 221, the unbalanced signal is handled from the output of the RF IC 221 to the antenna 247. Therefore, the balun 225 performs the signal conversions.

The switch 245 is connected to the balun 225 on the transmission side during the transmission and is connected to the balun 234 or the RF IC 221 on the reception side during the reception. The baseband IC 211 or the RF IC 221 may control the switch 245. There may be another circuit that controls the switch 245, and the circuit may control the switch 245.

The analog I signal and the analog Q signal at the radio frequency amplified by the preamplifier 224 are subjected to balanced-unbalanced conversion by the balun 225 and are then emitted as radio waves to the space from the antenna 247.

The antenna 247 may be a chip antenna, may be an antenna formed by wiring on a printed circuit board, or may be an antenna formed by using a linear conductive element.

The LNA 234 in the RF IC 221 amplifies a signal received from the antenna 247 through the switch 245 up to a level that allows demodulation, while maintaining the noise low. The balun 235 performs unbalanced-balanced conversion of the signal amplified by the low noise amplifier (LNA) 234. The mixer 233 uses the signal at the certain frequency input from the PLL 242 to down-convert, to a baseband, the reception signal converted to a balanced signal by the balun 235. More specifically, the mixer 233 includes a unit that generates carrier waves shifted by a phase of 90 degrees based on the signal at the certain frequency input from the PLL 242. The mixer 233 uses the carrier waves shifted by a phase of 90 degrees to perform quadrature demodulation of the reception signal converted by the balun 235 and generates an I (In-phase) signal with the same phase as the reception signal and a Q (Quad-phase) signal with the phase delayed by 90 degrees. The filter 232 extracts signals with desired frequency components from the I signal and the Q signal. Gains of the I signal and the Q signal extracted by the filter 232 are adjusted, and the I signal and the Q signal are output from the RF IC 221.

The ADC 217 in the baseband IC 211 performs AD conversion of the input signal from the RF IC 221. More specifically, the ADC 217 converts the I signal to a digital I signal and converts the Q signal to a digital Q signal. Note that a single system signal may be received without performing quadrature demodulation.

When a plurality of antennas are provided, the number of provided ADCs may correspond to the number of antennas. Based on the digital I signal and the digital Q signal, the baseband circuit 212 executes a process of the physical layer and the like, such as demodulation process, error correcting code process, and process of physical header, and obtains a frame. The baseband circuit 212 applies a process of the MAC layer to the frame. Note that the baseband circuit 212 may be configured to execute a process of TCP/IP when the TCP/IP is implemented.

The detailed description of the process of the above-described components is obvious from the description of FIGS. 7 and 8, and therefore redundant descriptions will be omitted.

Twelfth Embodiment

Figure 25:
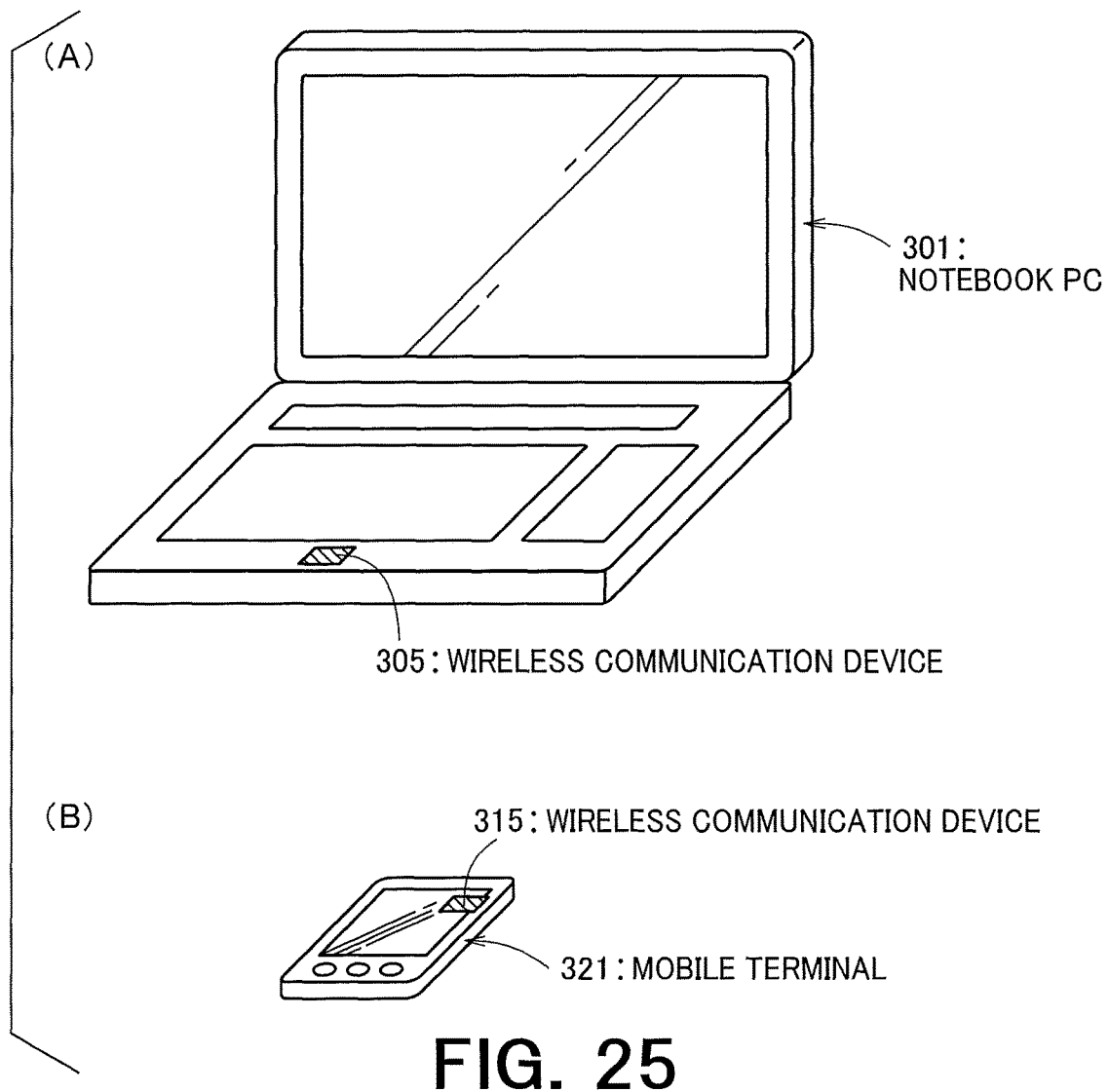
FIG. 25 is a perspective view showing a wireless terminal according to a twelfth embodiment.

FIG. 25(A) and FIG. 25(B) are perspective views of wireless terminal according to the twelfth embodiment. The wireless terminal in FIG. 25(A) is a notebook PC 301 and the wireless communication device (or a wireless device) in FIG. 25(B) is a mobile terminal 321. Each of them corresponds to one form of a terminal (which may indicate a base station). The notebook PC 301 and the mobile terminal 321 are equipped with wireless communication devices 305 and 315, respectively. The wireless communication device provided in a terminal (which may indicate a base station) which has been described above can be used as the wireless communication devices 305 and 315. A wireless terminal carrying a wireless communication device is not limited to notebook PCs and mobile terminals. For example, it can be installed in a TV, a digital camera, a wearable device, a tablet, a smart phone, a gaming device, a network storage device, a monitor, a digital audio player, a web camera, a video camera, a projector, a navigation system, an external adapter, an internal adapter, a set top box, a gateway, a printer server, a mobile access point, a router, an enterprise/service provider access point, a portable device, a handheld device, a vehicle and so on.

Figure 26:
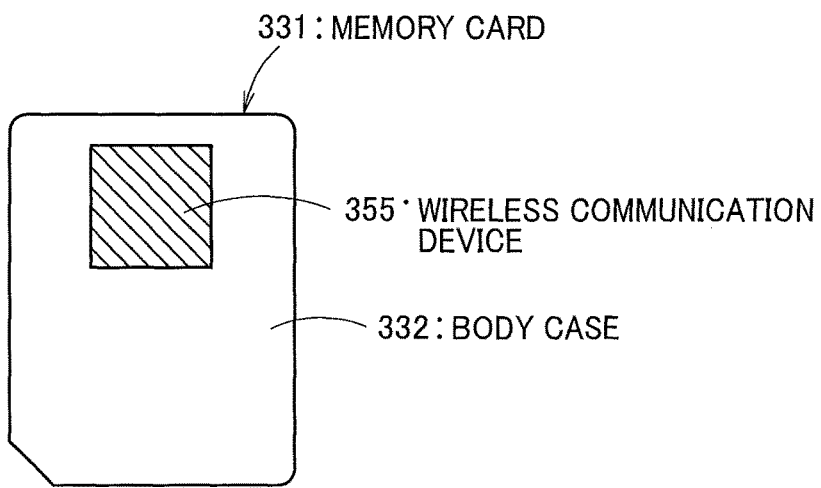
FIG. 26 shows a memory card according to the twelfth embodiment.

Moreover, a wireless communication device installed in a terminal (which may indicate a base station) can also be provided in a memory card. FIG. 26 illustrates an example of a wireless communication device mounted on a memory card. A memory card 331 contains a wireless communication device 355 and a body case 332. The memory card 331 uses the wireless communication device 355 for wireless communication with external devices. Here, in FIG. 26, the description of other installed elements (for example, a memory, and so on) in the memory card 331 is omitted.

Thirteenth Embodiment

In the thirteenth embodiment, a bus, a processor unit and an external interface unit are provided in addition to the configuration of the wireless communication device of the terminal (which may indicate the base station) according to any of the above embodiments. The processor unit and the external interface unit are connected with an external memory (a buffer) through the bus. A firmware operates the processor unit. Thus, by adopting a configuration in which the firmware is included in the wireless communication device, the functions of the wireless communication device can be easily changed by rewriting the firmware. The processing unit in which the firmware operates may be a processor that performs the process of the communication controlling device or the control unit according to the present embodiment, or may be another processor that performs a process relating to extending or altering the functions of the process of the communication controlling device or the control unit. The processing unit in which the firmware operates may be included in the access point or the wireless terminal according to the present embodiment. Alternatively, the processing unit may be included in the integrated circuit of the wireless communication device installed in the access point, or in the integrated circuit of the wireless communication device installed in the wireless terminal.

Fourteenth Embodiment

In the fourteenth embodiment, a clock generating unit is provided in addition to the configuration of the wireless communication device of the terminal (which may indicate the base station) according to any of the above embodiments. The clock generating unit generates a clock and outputs the clock from an output terminal to the exterior of the wireless communication device. Thus, by outputting to the exterior the clock generated inside the wireless communication device and operating the host by the clock output to the exterior, it is possible to operate the host and the wireless communication device in a synchronized manner.

Fifteenth Embodiment

In the fifteenth embodiment, a power source unit, a power source controlling unit and a wireless power feeding unit are included in addition to the configuration of the wireless communication device of the terminal (which may indicate the base station) according to any of the above embodiments. The power supply controlling unit is connected to the power source unit and to the wireless power feeding unit, and performs control to select a power source to be supplied to the wireless communication device. Thus, by adopting a configuration in which the power source is included in the wireless communication device, power consumption reduction operations that control the power source are possible.

Sixteenth Embodiment

In the sixteenth embodiment, a SIM card is added to the configuration of the wireless communication device according to any of the above embodiments. For example, the SIM card is connected with the controller, the transmitter, the receiver or plural of them in the wireless communication device. Thus, by adopting a configuration in which the SIM card is included in the wireless communication device, authentication processing can be easily performed.

Seventeenth Embodiment

In the seventeenth embodiment, a video image compressing/decompressing unit is added to the configuration of the wireless communication device according to any of the above embodiments. The video image compressing/decompressing unit is connected to the bus. Thus, by adopting a configuration in which the video image compressing/decompressing unit is included in the wireless communication device, transmitting a compressed video image and decompressing a received compressed video image can be easily done.

Eighteenth Embodiment

In the eighteenth embodiment, an LED unit is added to the configuration of the wireless communication device of the terminal (which may indicate the base station) according to any of the above embodiments. For example, the LED unit is connected to the controller, the transmitter, the receiver or plural of them in the wireless communication device. Thus, by adopting a configuration in which the LED unit is included in the wireless communication device, notifying the operation state of the wireless communication device to the user can be easily done.

Nineteenth Embodiment

In the nineteenth embodiment, a vibrator unit is included in addition to the configuration of the wireless communication device wireless communication device of the terminal (which may indicate the base station) according to any of the above embodiments. For example, the vibrator unit is connected to at least one of the controller, the transmitter, the receiver or plural of them in the wireless communication device. Thus, by adopting a configuration in which the vibrator unit is included in the wireless communication device, notifying the operation state of the wireless communication device to the user can be easily done.

Twentieth Embodiment

In a twentieth embodiment, the configuration of the wireless communication device includes a display in addition to the configuration of the wireless communication device (the wireless communication device of the terminal (which may indicate the base station) according to any one of the above embodiments. The display may be connected to the controller, the transmitter, the receiver or plural of them in the wireless communication device via a bus (not shown). As seen from the above, the configuration including the display to display the operation state of the wireless communication device on the display allows the operation status of the wireless communication device to be easily notified to a user.

Twenty-First Embodiment

In the present embodiment, [1] the frame type in the wireless communication system, [2] a technique of disconnection between wireless communication devices, [3] an access scheme of a wireless LAN system and [4] a frame interval of a wireless LAN are described.

[1] Frame Type in Communication System

Generally, as mentioned above, frames treated on a wireless access protocol in a wireless communication system are roughly divided into three types of the data frame, the management frame and the control frame. These types are successfully shown in a header part which is commonly provided to frames. As a display method of the frame type, three types may be distinguished in one field or may be distinguished by a combination of two fields. In IEEE 802.11 standard, identification of a frame type is made based on two fields of Type and Subtype in the Frame Control field in the header part of the MAC frame. The Type field is one for generally classifying frames into a data frame, a management frame, or a control frame and the Subtype field is one for identifying more detailed type in each of the classified frame types such as a beacon frame belonging to the management frame.

The management frame is a frame used to manage a physical communication link with a different wireless communication device. For example, there are a frame used to perform communication setting with the different wireless communication device or a frame to release communication link (that is, to disconnect the connection), and a frame related to the power save operation in the wireless communication device.

The data frame is a frame to transmit data generated in the wireless communication device to the different wireless communication device after a physical communication link with the different wireless communication device is established. The data is generated in a higher layer of the present embodiment and generated by, for example, a user's operation.

The control frame is a frame used to perform control at the time of transmission and reception (exchange) of the data frame with the different wireless communication device. A response frame transmitted for the acknowledgment in a case where the wireless communication device receives the data frame or the management frame, belongs to the control frame. The response frame is, for example, an ACK frame or a BlockACK frame. The RTS frame and the CTS frame are also the control frame.

These three types of frames are subjected to processing based on the necessity in the physical layer and then transmitted as physical packets via an antenna. In IEEE 802.11 standard (including the extended standard such as IEEE Std 802.11ac-2013), an association process is defined as one procedure for connection establishment. The association request frame and the association response frame which are used in the procedure are a management frame. Since the association request frame and the association response frame is the management frame transmitted in a unicast scheme, the frames causes the wireless communication terminal in the receiving side to transmit an ACK frame being a response frame. The ACK frame is a control frame as described in the above.

[2] Technique of Disconnection Between Wireless Communication Devices

For disconnection, there are an explicit technique and an implicit technique. As the explicit technique, a frame to disconnect any one of the connected wireless communication devices is transmitted. This frame corresponds to Deauthentication frame defined in IEEE 802.11 standard and is classified into the management frame. The frame for disconnection may be referred to as "release frame" by the meaning of releasing connection, for example. Normally, it is determined that the connection is disconnected at the timing of transmitting the release frame in a wireless communication device on the side to transmit the release frame and at the timing of receiving the release frame in a wireless communication device on the side to receive the release frame. Afterward, it returns to the initial state in a communication phase, for example, a state to search for a wireless communication device of the communicating partner. In a case that the wireless communication base station disconnects with a wireless communication terminal, for example, the base station deletes information on the wireless communication device from a connection management table if the base station holds the connection management table for managing wireless communication terminals which entries into the BSS of the base station-self. For example, in a case that the base station assigns an AID to each wireless communication terminal which entries into the BSS at the time when the base station permitted each wireless communication terminal to connect to the base station-self in the association process, the base station deletes the held information related to the AID of the wireless communication terminal disconnected with the base station and may release the AID to assign it to another wireless communication device which newly entries into the BSS.

On the other hand, as the implicit technique, it is determined that the connection state is disconnected in a case where frame transmission (transmission of a data frame and management frame or transmission of a response frame with respect to a frame transmitted by the subject device) is not detected from a wireless communication device of the connection partner which has established the connection for a certain period. Such a technique is provided because, in a state where it is determined that the connection is disconnected as mentioned above, a state is considered where the physical wireless link cannot be secured, for example, the communication distance to the wireless communication device of the connection destination is separated and the radio signals cannot be received or decoded. That is, it is because the reception of the release frame cannot be expected.

As a specific example to determine the disconnection of connection in an implicit method, a timer is used. For example, at the time of transmitting a data frame that requests an acknowledgment response frame, a first timer (for example, a retransmission timer for a data frame) that limits the retransmission period of the frame is activated, and, if the acknowledgement response frame to the frame is not received until the expiration of the first timer (that is, until a desired retransmission period passes), retransmission is performed. When the acknowledgment response frame to the frame is received, the first timer is stopped.

On the other hand, when the acknowledgment response frame is not received and the first timer expires, for example, a management frame to confirm whether a wireless communication device of a connection partner is still present (in a communication range) (in other words, whether a wireless link is secured) is transmitted, and, at the same time, a second timer (for example, a retransmission timer for the management frame) to limit the retransmission period of the frame is activated. Similarly to the first timer, even in the second timer, retransmission is performed if an acknowledgment response frame to the frame is not received until the second timer expires, and it is determined that the connection is disconnected when the second timer expires.

Alternatively, a third timer is activated when a frame is received from a wireless communication device of the connection partner, the third timer is stopped every time the frame is newly received from the wireless communication device of the connection partner, and it is activated from the initial value again. When the third timer expires, similarly to the above, a management frame to confirm whether the wireless communication device of the connection party is still present (in a communication range) (in other words, whether a wireless link is secured) is transmitted, and, at the same time, a second timer (for example, a retransmission timer for the management frame) to limit the retransmission period of the frame is activated. Even in this case, retransmission is performed if an acknowledgment response frame to the frame is not received until the second timer expires, and it is determined that the connection is disconnected when the second timer expires. The latter management frame to confirm whether the wireless communication device of the connection partner is still present may differ from the management frame in the former case. Moreover, regarding the timer to limit the retransmission of the management frame in the latter case, although the same one as that in the former case is used as the second timer, a different timer may be used.

[3] Access Scheme of Wireless LAN System

For example, there is a wireless LAN system with an assumption of communication or competition with a plurality of wireless communication devices. CSMA/CA is set as the basis of an access scheme in the IEEE802.11 (including an extension standard or the like) wireless LAN. In a scheme in which transmission by a certain wireless communication device is grasped and transmission is performed after a fixed time from the transmission end, simultaneous transmission is performed in the plurality of wireless communication devices that grasp the transmission by the wireless communication device, and, as a result, radio signals collide and frame transmission fails. By grasping the transmission by the certain wireless communication device and waiting for a random time from the transmission end, transmission by the plurality of wireless communication devices that grasp the transmission by the wireless communication device stochastically disperses. Therefore, if the number of wireless communication devices in which the earliest time in a random time is subtracted is one, frame transmission by the wireless communication device succeeds and it is possible to prevent frame collision. Since the acquisition of the transmission right based on the random value becomes impartial between the plurality of wireless communication devices, it can say that a scheme adopting Carrier Avoidance is a suitable scheme to share a radio medium between the plurality of wireless communication devices.

[4] Frame Interval of Wireless LAN

The frame interval of the IEEE802.11 wireless LAN is described. There are several types of frame intervals used in the IEEE802.11 wireless LAN, such as distributed coordination function interframe space (DIFS), arbitration interframe space (AIFS), point coordination function interframe space (PIFS), short interframe space (SIFS), extended interframe space (EIFS) and reduced interframe space (RIFS).

The definition of the frame interval is defined as a continuous period that should confirm and open the carrier sensing idle before transmission in the IEEE802.11 wireless LAN, and a strict period from a previous frame is not discussed. Therefore, the definition is followed in the explanation of the IEEE802.11 wireless LAN system. In the IEEE802.11 wireless LAN, a waiting time at the time of random access based on CSMA/CA is assumed to be the sum of a fixed time and a random time, and it can say that such a definition is made to clarify the fixed time.

DIFS and AIFS are frame intervals used when trying the frame exchange start in a contention period that competes with other wireless communication devices on the basis of CSMA/CA. DIFS is used in a case where priority according to the traffic type is not distinguished, AIFS is used in a case where priority by traffic identifier (TID) is provided.

Since operation is similar between DIFS and AIFS, an explanation below will mainly use AIFS. In the IEEE802.11 wireless LAN, access control including the start of frame exchange in the MAC layer is performed. In addition, in a case where QoS (Quality of Service) is supported when data is transferred from a higher layer, the traffic type is notified together with the data, and the data is classified for the priority at the time of access on the basis of the traffic type. The class at the time of this access is referred to as "access category (AC)". Therefore, the value of AIFS is provided every access category.

PIFS denotes a frame interval to enable access which is more preferential than other competing wireless communication devices, and the period is shorter than the values of DIFS and AIFS. SIFS denotes a frame interval which can be used in a case where frame exchange continues in a burst manner at the time of transmission of a control frame of a response system or after the access right is acquired once. EIFS denotes a frame interval caused when frame reception fails (when the received frame is determined to be error).

RIFS denotes a frame interval which can be used in a case where a plurality of frames are consecutively transmitted to the same wireless communication device in a burst manner after the access right is acquired once, and a response frame from a wireless communication device of the transmission partner is not requested while RIFS is used.

Figure 27:
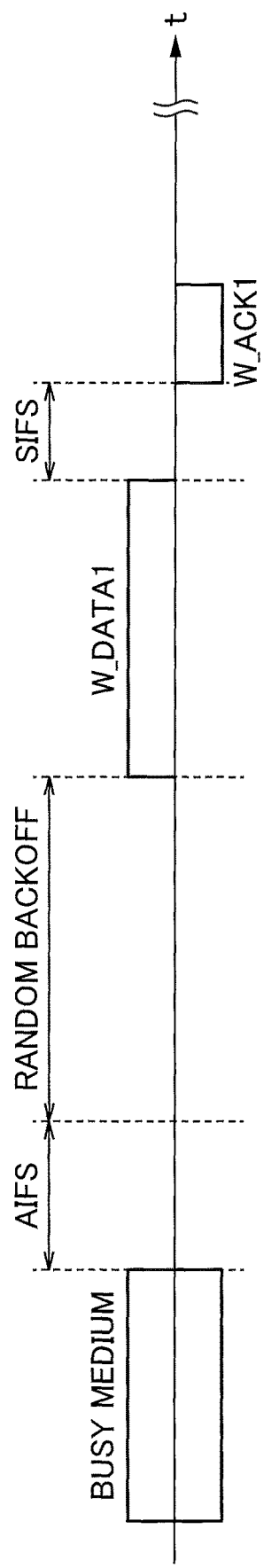
FIG. 27 shows an example of replacement of frames during a contention period.

Here, FIG. 27 illustrates one example of frame exchange in a competitive period based on the random access in the IEEE802.11 wireless LAN.

When a transmission request of a data frame (W_DATA1) is generated in a certain wireless communication device, a case is assumed where it is recognized that a medium is busy (busy medium) as a result of carrier sensing. In this case, AIFS of a fixed time is set from the time point at which the carrier sensing becomes idle, and, when a random time (random backoff) is set afterward, data frame W_DATA1 is transmitted to the communicating partner.

The random time is acquired by multiplying a slot time by a pseudorandom integer led from uniform distribution between contention windows (CW) given by integers from 0. Here, what multiplies CW by the slot time is referred to as "CW time width". The initial value of CW is given by CWmin, and the value of CW is increased up to CWmax every retransmission. Similarly to AIFS, both CWmin and CWmax have values every access category. In a wireless communication device of transmission destination of W_DATA1, when reception of the data frame succeeds, a response frame (W_ACK1) is transmitted after SIFS from the reception end time point. If it is within a transmission burst time limit when W_ACK1 is received, the wireless communication device that transmits W_DATA1 can transmit the next frame (for example, W_DATA2) after SIFS.

Although AIFS, DIFS, PIFS and EIFS are functions between SIFS and the slot-time, SIFS and the slot time are defined every physical layer. Moreover, although parameters whose values being set according to each access category, such as AIFS, CWmin and CWmax, can be set independently by a communication group (which is a basic service set (BSS) in the IEEE802.11 wireless LAN), the default values are defined.

For example, in the definition of 802.11ac, with an assumption that SIFS is 16 μs and the slot time is 9 μs, and thereby PIFS is 25 μs, DIFS is 34 μs, the default value of the frame interval of an access category of BACKGROUND (AC_BK) in AIFS is 79 μs, the default value of the frame interval of BEST EFFORT (AC_BE) is 43 μs, the default value of the frame interval between VIDEO (AC_VI) and VOICE (AC_VO) is 34 μs, and the default values of CWmin and CWmax are 31 and 1023 in AC_BK and AC_BE, 15 and 31 in AC_VI and 7 and 15 in AC_VO. Here, EIFS denotes the sum of SIFS, DIFS, and the time length of a response frame transmitted at the lowest mandatory physical rate. In the wireless communication device which can effectively takes EIFS, it may estimate an occupation time length of a PHY packet conveying a response frame directed to a PHY packet due to which the EIFS is caused and calculates a sum of SIFS, DIFS and the estimated time to take the EIFS.

Note that the frames described in the embodiments may indicate not only things called frames in, for example, IEEE 802.11 standard, but also things called packets, such as Null Data Packets.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor. The term "circuitry" may refer to not only electric circuits or a system of circuits used in a device but also a single electric circuit or a part of the single electric circuit. Moreover, the term "circuitry" may refer one or more electric circuits disposed on a single chip, or may refer one or more electric circuits disposed on a plurality of chips or a plurality of devices in a dispersed manner.

In the specification, the expression "at least one of a, b or c" is an expression to encompass not only "a", "b", "c", "a and b", "a and c", "b and c", "a, b and c" or any combination thereof but also a combination of at least a plurality of same elements such as "a and a", "a, b and b" or "a, a, b, b, c and c". Also, the expression is an expression to allow a set including an element other than "a", "b" and "c" such as "a, b, c, and d"

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A wireless communication device comprising:
a controller configured to read first information on correspondence between MAC (Media Access Control) addresses and AIDs (Association Identifiers) for one or more target terminals from a first hardware storage including second information on correspondence between MAC addresses and AIDs for a plurality of terminals, the first information being part of the second information, and store the first information in a second hardware storage,
a transmitter configured to transmit a first frame containing information for specifying resource units allocated to the one or more target terminals;
a receiver configured to receive one or more second frames transmitted in response to the first frame via one of the resource units in Uplink OFDMA (Orthogonal Frequency Division Multiple Access) from at least one of the one or more target terminals, the one or more second frames including MAC addresses of the at least one of the one or more target terminals which have transmitted the one or more second frames;
wherein
the controller is configured to specify the received MAC addresses included in the one or more second frames, access the second hardware storage to read the first information and obtain AIDs corresponding to the specified MAC addresses which are AIDs of the at least one of the one or more target terminals, and
the transmitter is configured to transmit a third frame including sets of
the AIDs of the at least one of the one or more target terminals and
acknowledgement information indicating success or failure of reception of the one or more seconds from the at least one of the one or more target terminals.

2. The wireless communication device according to claim 1, comprising a first frame generator configured to generate the first frame,
the controller provides an instruction signal for generating the first frame to the first frame generator while the controller read the first information from the first hardware storage and the store the first information in the second hardware storage device.

3. The wireless communication device according to claim 1, wherein the first hardware storage is accessible via a firmware and the second hardware storage is accessible not via the firmware.

4. The wireless communication device according to claim 1, wherein the second hardware storage is a memory.

5. The wireless communication device according to claim 1, wherein the first frame is a trigger frame.

6. The wireless communication device according to claim 1, wherein the transmitter is configured to transmit the third frame in elapse of a predetermined time after the one or more second frames are received.

7. The wireless communication device according to claim 1, wherein the predetermined time is a SIFS (Short Interframe Space).

8. The wireless communication device according to claim 1, further comprising at least one antenna.

9. A wireless communication method performed by a wireless communication device comprising:
reading first information between MAC (Media Access Control) addresses and AIDs (Association Identifiers) for one or more target terminals from a first hardware storage including second information on correspondence between MAC addresses and AIDs for a plurality of terminals, the first information being part of the second information;
storing the first information in a second hardware storage,
transmitting a first frame containing information for specifying resource units allocated to the one or more target terminals;
receiving one or more second frames transmitted in response to the first frame via one of the resource units in Uplink OFDMA (Orthogonal Frequency Division Multiple Access) from at least one of the one or more target terminals, the one or more second frames including MAC addresses of the at least one of the one or more target terminals which have transmitted the one or more second frames;
specifying the received MAC addresses included in the one or more second frames, access the second hardware storage to read the first information and obtain AIDs corresponding to the specified MAC addresses which are AIDs of the at least one of the one or more target terminals;
transmitting a third frame including sets of
the AIDs of the at least one of the one or more target terminals and
acknowledgement information indicating success or failure of reception of the one or more seconds from the at least one of the one or more target terminals.

* * * * *